US012618388B2

(12) United States Patent
Naganawa

(10) Patent No.: US 12,618,388 B2
(45) **Date of Patent: *May 5, 2026**

(54) ENGINE DEVICE

(71) Applicant: Yanmar Power Technology Co., Ltd., Osaka (JP)

(72) Inventor: Hiroaki Naganawa, Osaka (JP)

(73) Assignee: Yanmar Power Technology Co., Ltd., Osaka (JP)

( * ) Notice: Subject to any disclaimer, the term of this patent is extended or adjusted under 35 U.S.C. 154(b) by 907 days.

This patent is subject to a terminal disclaimer.

(21) Appl. No.: 16/917,718

(22) Filed: Jun. 30, 2020

(65) Prior Publication Data

US 2020/0332753 A1 Oct. 22, 2020

Related U.S. Application Data

(63) Continuation of application No. 16/091,880, filed as application No. PCT/JP2017/014398 on Apr. 6, 2017, now Pat. No. 10,731,617.

(30) Foreign Application Priority Data

Apr. 8, 2016 (JP) ................................ 2016-078468
Apr. 8, 2016 (JP) ................................ 2016-078469

(51) Int. Cl.
*F02M 63/02* (2006.01)
*F01P 3/02* (2006.01)
(Continued)

(52) U.S. Cl.
CPC ........... *F02M 63/0275* (2013.01); *F01P 3/02* (2013.01); *F02B 61/06* (2013.01); *F02B 67/00* (2013.01);
(Continued)

(58) Field of Classification Search
CPC .. F02M 63/0275; F02M 55/025; F02M 39/00; F02M 69/465; F02M 26/17; F02M 35/104; F02M 2200/247; F02M 2200/248; F02M 51/005; F02M 63/0265; F02M 2200/857; F02B 67/00; F02B 61/06; F02B 67/08; F02F 1/10; F02F 7/00; F02F 7/007; F02F 7/0068; F01P 3/02; F01P 5/12; F01P 2003/021; F02D 41/3809
(Continued)

(56) References Cited

U.S. PATENT DOCUMENTS

2005/0205066 A1* 9/2005 Maegoya .............. F02M 61/14 123/456
2007/0068498 A1* 3/2007 Hataura .................... F01P 1/06 123/184.21
(Continued)

*Primary Examiner* — Yi-Kai Wang
(74) *Attorney, Agent, or Firm* — Chris Mizumoto

(57) ABSTRACT

An engine includes a common rail attached to one side portion of a cylinder block that pivotally supports a crankshaft in a rotatable mariner, the one side portion extending along a crankshaft center, and the common rail being configured to supply a fuel to the engine. A flywheel housing that accommodates a flywheel that is rotated integrally with the crankshaft is disposed in one side portion out of opposite side portions of the cylinder block intersecting the one side portion. One end portion of the common rail is disposed above the flywheel housing.

12 Claims, 29 Drawing Sheets

(51) Int. Cl.

| | |
|---|---|
| ***F02B 61/06*** | (2006.01) |
| ***F02B 67/00*** | (2006.01) |
| ***F02B 67/08*** | (2006.01) |
| ***F02D 41/38*** | (2006.01) |
| ***F02F 1/10*** | (2006.01) |
| ***F02F 7/00*** | (2006.01) |
| ***F02M 26/17*** | (2016.01) |
| ***F02M 35/104*** | (2006.01) |
| ***F02M 39/00*** | (2006.01) |
| ***F02M 55/02*** | (2006.01) |
| ***F02M 69/46*** | (2006.01) |
| *F01P 5/12* | (2006.01) |
| *F02M 51/00* | (2006.01) |

(52) U.S. Cl.

CPC .......... *F02B 67/08* (2013.01); *F02D 41/3809* (2013.01); *F02F 1/10* (2013.01); *F02F 7/00* (2013.01); *F02F 7/0068* (2013.01); *F02F 7/007* (2013.01); *F02M 26/17* (2016.02); *F02M 35/104* (2013.01); *F02M 39/00* (2013.01); *F02M 55/025* (2013.01); *F02M 69/465* (2013.01); *F01P 2003/021* (2013.01); *F01P 5/12* (2013.01); *F02M 51/005* (2013.01); *F02M 63/0265* (2013.01); *F02M 2200/247* (2013.01); *F02M 2200/248* (2013.01); *F02M 2200/857* (2013.01)

(58) Field of Classification Search

USPC ........................................................ 123/41.47

See application file for complete search history.

(56) References Cited

U.S. PATENT DOCUMENTS

| | | | | |
|---|---|---|---|---|
| 2010/0294242 | A1* | 11/2010 | Kondo | G01L 23/18 123/470 |
| 2012/0102932 | A1* | 5/2012 | Mitsuda | F01N 3/0211 60/311 |
| 2016/0146162 | A1* | 5/2016 | Janke | F02M 26/28 165/174 |
| 2016/0245150 | A1* | 8/2016 | Owaki | F01P 7/165 |
| 2018/0003093 | A1* | 1/2018 | Oso | F16H 57/0421 |

* cited by examiner

ENGINE DEVICE

CROSS-REFERENCE

This is a continuation of U.S. patent application Ser. No. 16/091,880 filed on Oct. 5, 2018, which is a national stage entry of PCT/JP2017/014398 filed on Apr. 6, 2017, which claims priority to Japanese Patent Application Nos. JP2016-078468, and JP2016-078469, both filed on Apr. 8, 2016. All of the documents cited above are incorporated by reference in their entirety.

TECHNICAL FIELD

The present invention relates to an engine device, and particularly to an engine device including a common rail that is attached to one side portion of a cylinder block along a crankshaft center thereof, the cylinder block pivotally supporting a crankshaft in a freely rotatable manner.

BACKGROUND ART

Recently, use of a common rail in a diesel engine is prevailing because of, for example, an increase in injection pressure due to an increased demand for a lowered fuel consumption (see, for example, Patent Literature 1 (PTL 1)). The common rail, which is often attached to a cylinder block, stores a fuel supplied from a fuel tank under a high pressure.

CITATION LIST

Patent Literature

PTL 1: Japanese Patent Application Laid-Open No. 2008-297989

SUMMARY OF INVENTION

Technical Problem

A conventional technique involves a problem that disposing a common rail on one side of a cylinder block limits a space for attaching a member other than the common rail. There has been a demand that an area occupied by a region where the common rail is disposed on one side of the cylinder block be reduced.

In view of the problems described above, an object of the present invention is to reduce an area occupied by a region where a common rail is disposed on one side of the cylinder block.

Solution to Problem

An engine device according to an aspect of the present invention includes a common rail attached to one lateral side portion of a cylinder block that pivotally supports a crankshaft in a rotatable manner, the one lateral side portion extending along a crankshaft center, the common rail being configured to supply a fuel to an engine, wherein: a flywheel housing is disposed in one side portion out of opposite side portions of the cylinder block intersecting the one lateral side portion, the flywheel housing accommodating a flywheel that is rotated integrally with the crankshaft and one end portion of the common rail is disposed above the flywheel housing.

The engine device according to the aspect of the present invention may be configured, for example, such that a connector of the common rail electrically connected to an engine controller is disposed below an intake manifold that is provided to a cylinder head mounted on the cylinder block.

It may be possible that, for example, the intake manifold is formed integrally with the cylinder head. Here, the intake manifold may be formed separately from the cylinder head and may be configured to be coupled to the cylinder head.

It may be possible that: the one lateral side portion of the cylinder block has a concavo-convex surface portion that corresponds to a shape of a coolant passage provided inside the cylinder block, and a connection port of the connector is directed toward a concave region of the concavo-convex surface portion in a side view.

The engine device according to the aspect of the present invention may be configured, for example, such that: an exhaust-gas recirculation device is coupled to the intake manifold, the exhaust-gas recirculation device being configured to mix part of an exhaust gas discharged from an exhaust manifold with fresh air; and a fuel injection pipe extending from the common rail toward the cylinder head passes through a space between the cylinder head and the exhaust-gas recirculation device.

It may be possible that a fuel feed pump that is attached to the cylinder block is disposed below the exhaust-gas recirculation device, the fuel feed pump being configured to supply a fuel to the common rail.

It may be possible that: the fuel feed pump is attached to a housing bracket portion that protrudes from the one lateral side portion of the cylinder block; and a reinforcing rib that couples the one lateral side portion to the housing bracket portion is disposed below the fuel feed pump.

The engine device according to the aspect of the present invention may be configured, for example, such that: the common rail has, in the one end portion, a pipe joint member for returning a surplus fuel; and in a cylinder head mounted on the cylinder block, a surplus fuel outlet for a surplus fuel from a fuel injection device is provided near an intersection between the one lateral side portion and the one side portion of the cylinder block in a plan view.

The engine device according to the aspect of the present invention may be configured, for example, such that: a coolant-circulating coolant pump is disposed in the other side portion out of the opposite side portions of the cylinder block intersecting the one lateral side portion; and a coolant passage that connects a coolant passage inlet to a coolant passage outlet is provided in the cylinder block, and a coolant inlet member having a coolant inlet is detachably attached to the coolant passage inlet, the coolant passage inlet being opened in the one lateral side portion or the other lateral side portion intersecting the other side portion of the cylinder block, the coolant passage outlet being opened in the other side portion and being connected with a pump suction port of the coolant pump.

A configuration may be further possible in which: a rotational force of the crankshaft is transmitted to a pump shaft of the coolant pump through an endless band; and a pump suction port connecting portion, a boss portion for a pump-attaching bolt, and a rib portion are provided in the other side portion, the pump suction port connecting portion protruding and having an end surface in which the coolant passage outlet is formed, the boss portion protruding at a position apart from the pump suction port connecting portion, the position being on a side against a load direction of a load that is applied to the pump shaft due to a tension of the endless band, the rib portion coupling the pump suction port connecting portion to the boss portion and protruding with such a protruding height that the rib portion is not in contact with the coolant pump.

It may be possible that, for example, a plurality of bolt hole groups are provided around the coolant passage inlet, the plurality of bolt hole groups enabling the coolant inlet member to be attached at a plurality of attachment positions.

Advantageous Effects of Invention

In an embodiment of the engine device of the present invention, a flywheel housing for accommodating a flywheel that is rotated integrally with a crankshaft is disposed in one side portion out of opposite side portions of a cylinder block intersecting one lateral side portion of the cylinder block to which a common rail is attached, and one end portion of the common rail is disposed above the flywheel housing. With this configuration, an area occupied by a region where the common rail is disposed on one lateral side portion of the cylinder block can be reduced as compared to a configuration in which the whole of the common rail is disposed on one lateral side portion of the cylinder block. The engine device according to the embodiment of the present invention can enhance the degree of freedom in layout of other members on one lateral side portion of the cylinder block where the common rail is attached.

In the embodiment, a connector of the common rail, which is electrically connected to an engine controller, is disposed below an intake manifold that is provided to a cylinder head mounted on the cylinder block. Conventionally, the connector would be exposed and there could be a fear of damage or disconnection of the connector. In this respect, in the engine device according to the aspect of the present invention, the connector can be protected because it is disposed below the intake manifold.

The intake manifold may, for example, be formed integrally with the cylinder head. Such a configuration can enhance a gas sealability between the intake manifold and an intake fluid passage, and also can enhance a rigidity of the cylinder head. In addition, in a case of coupling an accessory component such as an EGR device to the cylinder head, the above configuration can support the component with an enhanced rigidity, and also can reduce the number of component pans because the need for a seal member on the intake side in the cylinder head can be reduced.

The engine device of the embodiment may be configured such that: an exhaust-gas recirculation device is coupled to the intake manifold, the exhaust-gas recirculation device being configured to mix part of an exhaust gas discharged from the exhaust manifold with fresh air; a fuel injection pipe extending from the common rail toward the cylinder head passes through a space between the cylinder head and the exhaust-gas recirculation device. With this configuration, the fuel injection pipe can be protected by the exhaust-gas recirculation device. This can solve a conventional problem that a fuel injection pipe assembled to an outer peripheral portion of an engine device may be deformed or fuel leakage may be caused due to contact between the engine device and another member during transportation or due to falling of a foreign object, for example.

It may be possible that a fuel feed pump that is attached to the cylinder block is disposed below the exhaust-gas recirculation device, the fuel feed pump being configured to supply a fuel to the common rail. This configuration can protect the fuel feed pump against contact with a foreign object coming from above, such as a tool falling at a time of assembling. Thus, damage of the fuel feed pump can be prevented.

It may be possible that: the fuel feed pump is attached to a housing bracket portion that protrudes from the one lateral side portion of the cylinder block; and a reinforcing rib that couples the one lateral side portion to the protruding portion is disposed below the fuel feed pump. This configuration can protect the fuel feed pump against contact with a foreign object, such as a stone, coming from below. As a result, damage of the fuel feed pump can be further prevented.

It may be possible that: one lateral side portion of the cylinder block has a concavo-convex surface portion that corresponds to a shape of a coolant passage provided inside the cylinder block; and a connection port of the connector is directed toward a concave region of the concavo-convex surface portion in a side view. This enables a harness-side connector to be attached to the connector so as to extend along the concave region of the concavo-convex surface portion, which can enhance operability in attaching harnesses. Furthermore, this enables the connector to be arranged at a location relatively close to the cylinder block, as compared to a configuration in which the connection port of the connector is directed toward the outside of the engine device. Thus, the width of the engine as a whole can be reduced.

The engine device of the embodiment may be configured such that: the common rail has, in the one end portion, a pipe joint member for returning a surplus fuel; and in a cylinder head mounted on the cylinder block, a surplus fuel outlet for a surplus fuel from a fuel injection device is provided near an intersection between the one lateral side portion and the one side portion of the cylinder block in a plan view. With this configuration, a surplus fuel return path that connects the pipe joint member for returning a surplus fuel, which is provided in the end portion of the common rail, to the cylinder head can be shorted and simplified. This can solve a conventional problem that a surplus fuel return path for returning a surplus fuel from a fuel injection device is elongated and complicated.

The engine device of the embodiment may be configured, for example, such that: a coolant-circulating coolant pump is disposed in the other side portion out of the opposite side portions of the cylinder block intersecting the one lateral side portion; and a coolant passage that connects a coolant passage inlet to a coolant passage outlet is provided in the cylinder block, and a coolant inlet member having a coolant inlet is detachably attached to the coolant passage inlet, the coolant passage inlet being opened in the one lateral side portion or the other lateral side portion intersecting the other side portion of the cylinder block, the coolant passage outlet being opened in the other side portion and being connected with a pump suction port of the coolant pump. With this configuration, the position of the coolant inlet can be changed just by changing the shape or the like of the coolant inlet member. This enables the position of the coolant inlet of the coolant pump to be changed easily. Accordingly, the position of the coolant inlet of the coolant pump and the direction in which the coolant inlet of the coolant pump is opened can be changed without causing any major design change or any increase in manufacturing costs.

It may be possible that: a rotational force of the crankshaft is transmitted to a pump shaft of the coolant pump through an endless band; and a pump suction port connecting portion, a boss portion for a pump-attaching bolt, and a rib portion are provided in the other side portion, the pump suction port connecting portion protruding and having an end surface in which the coolant passage outlet is formed, the boss portion protruding at a position apart from the pump suction port connecting portion, the position being on a side against a load direction of a load that is applied to the pump shaft due to a tension of the endless band, the rib portion coupling the pump suction port connecting portion to the boss portion and protruding with such a protruding height that the rib portion is not in contact with the coolant pump. In this configuration, a tight contact surface between the pump suction port connecting portion and the pump suction port is separated from a fastening-bearing surface of the boss portion for a pump-attaching bolt, and in addition, the rib portion enhances a rigidity of the boss portion. This can make the tight contact surface less likely to receive deformation of the coolant pump caused by the load applied due to the tension of the endless band. Thus, tight contact properties of the tight contact surface can be obtained.

It may be possible that a plurality of bolt hole groups are provided around the coolant passage inlet, the plurality of bolt hole groups enabling the coolant inlet member to be attached at a plurality of attachment positions. With this configuration, the position of the coolant inlet and the direction in which the coolant inlet is opened can be easily changed by changing the attachment position of the coolant inlet member, without causing an increase in manufacturing costs.

DESCRIPTION OF EMBODIMENT

Figure 1:
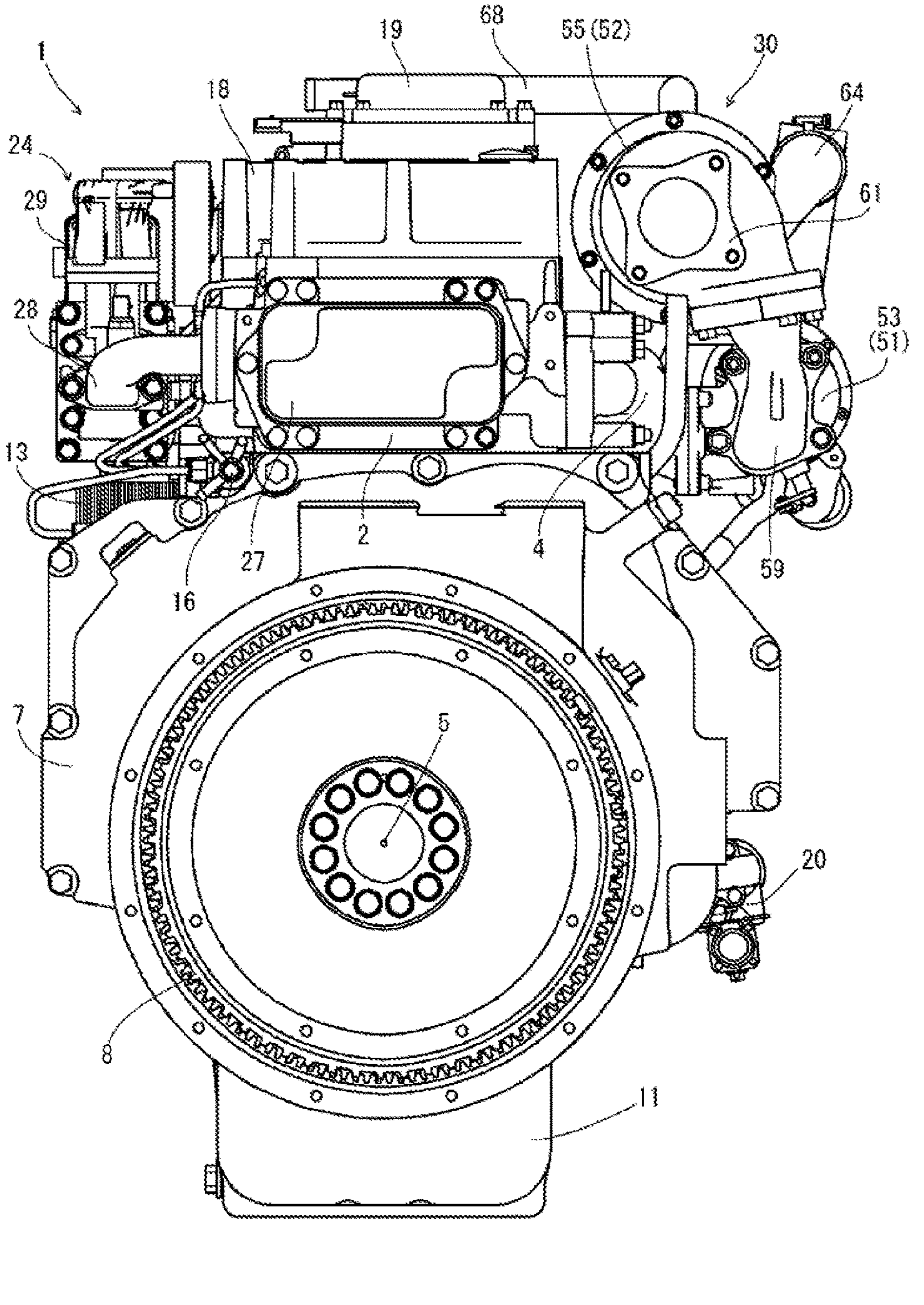
FIG. 1 A front view of an engine.
Figure 2:
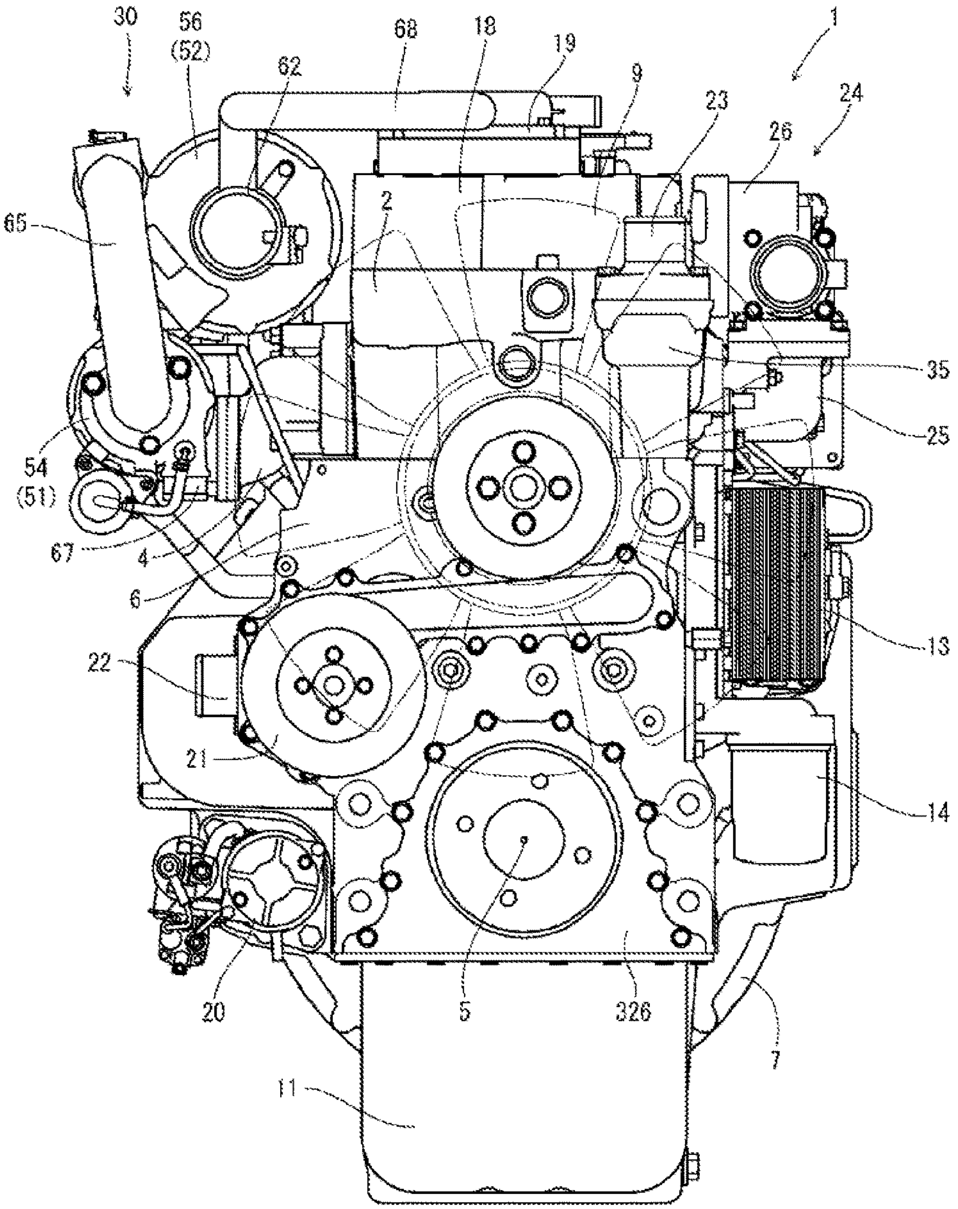
FIG. 2 A rear view of the engine.
Figure 3:
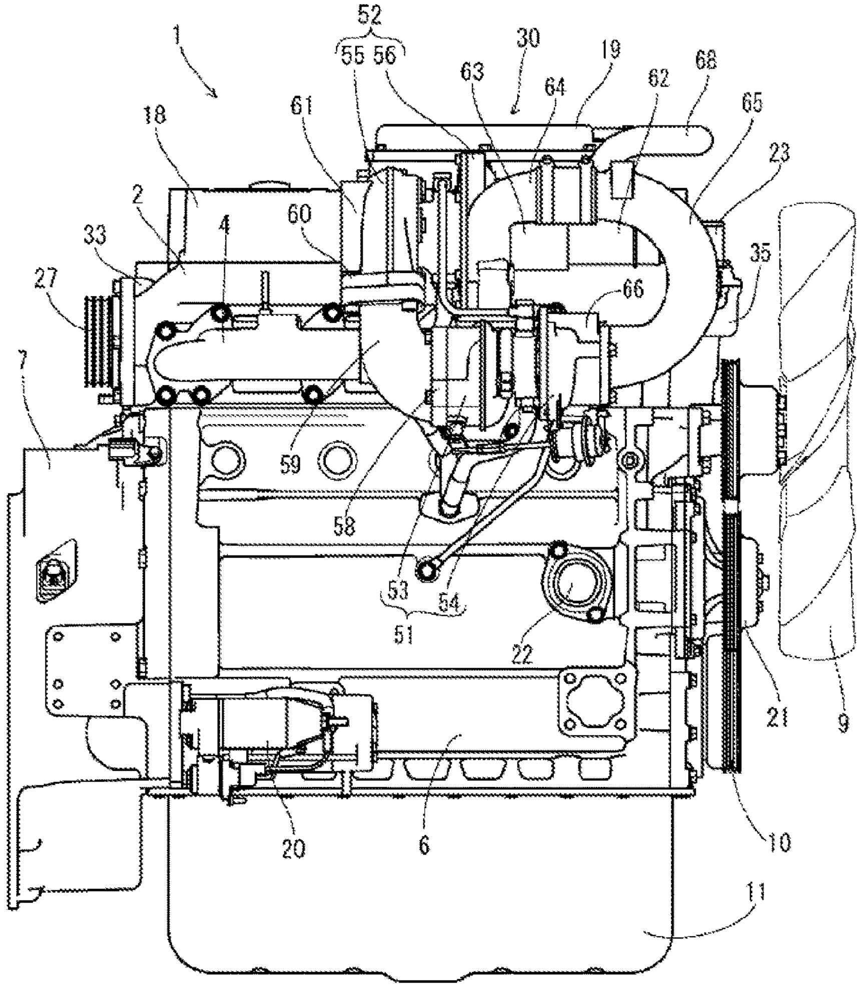
FIG. 3 A left side view of the engine.
Figure 4:
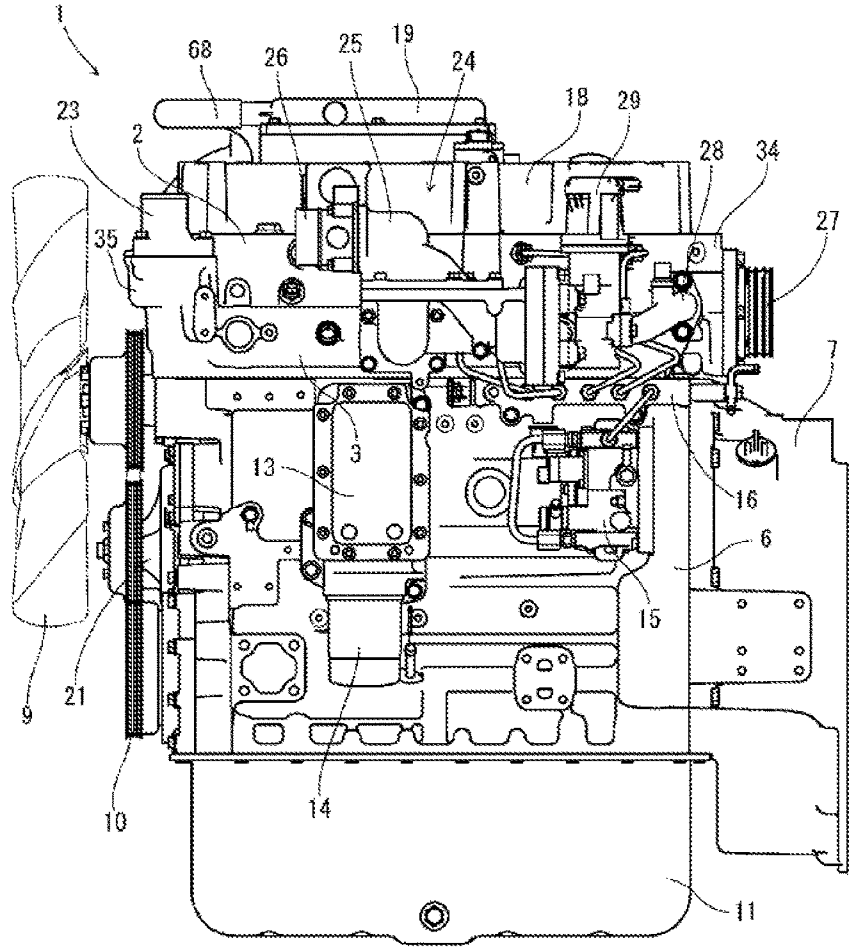
FIG. 4 A right side view of the engine.
Figure 5:
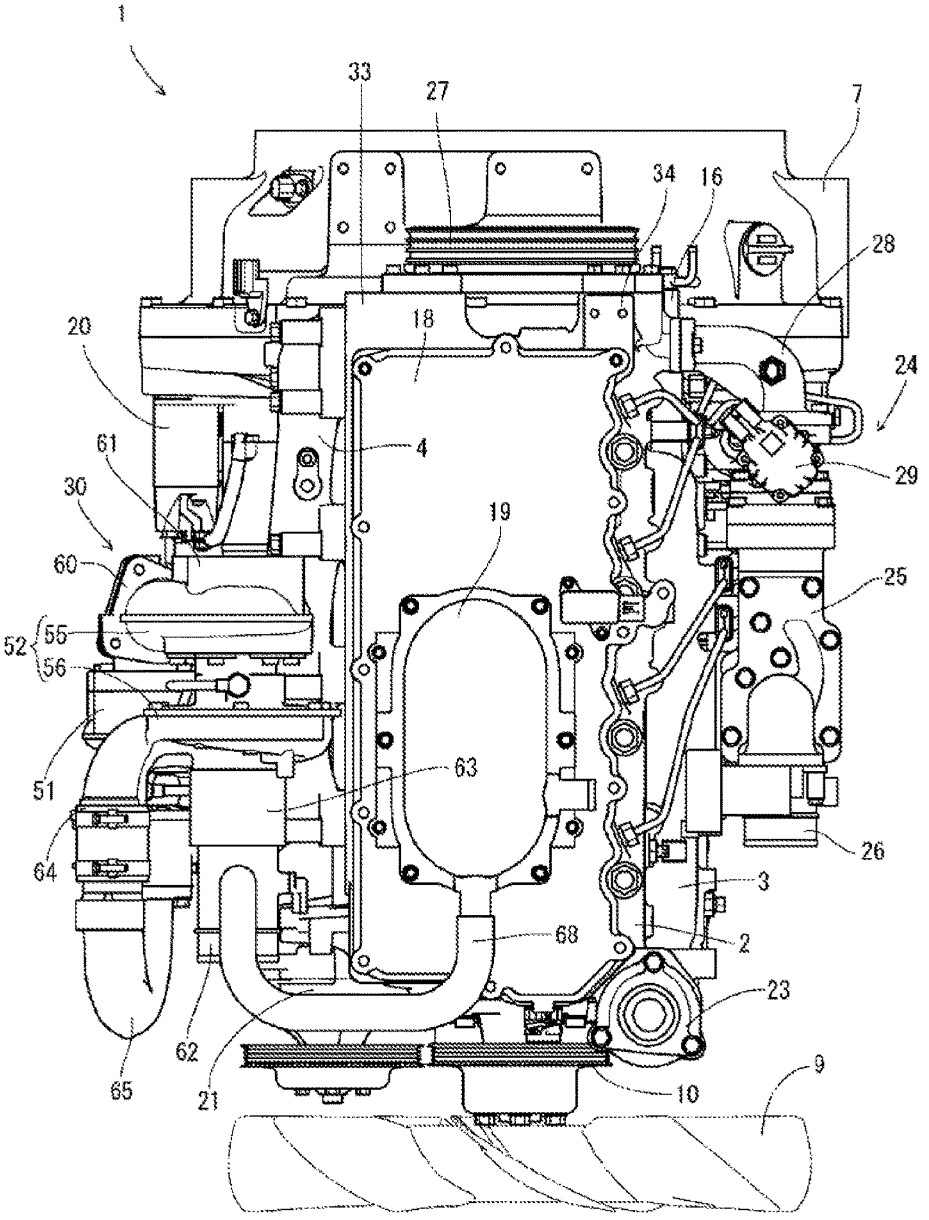
FIG. 5 A top plan view of the engine.
Figure 6:
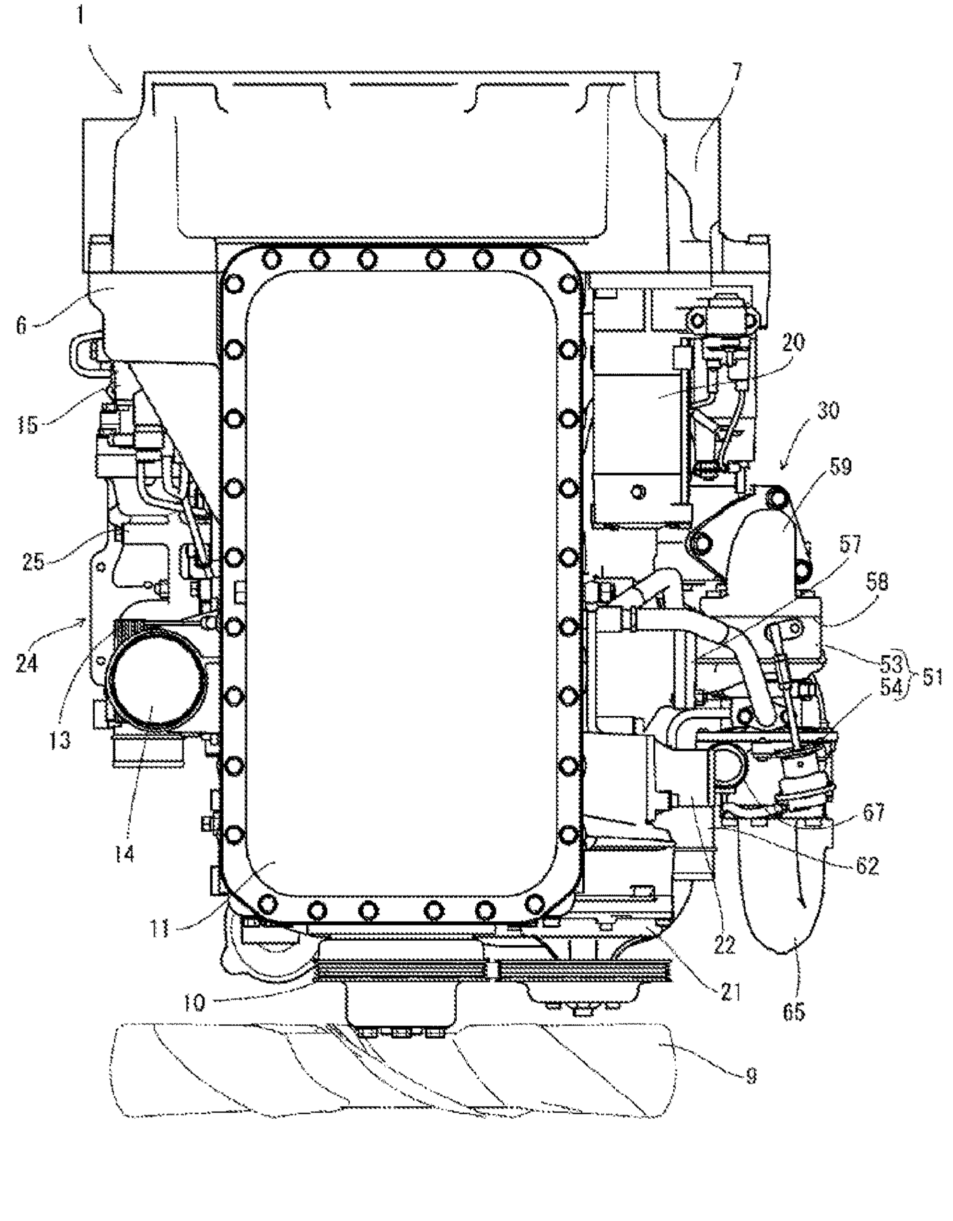
FIG. 6 A bottom plan view of the engine.
Figure 7:
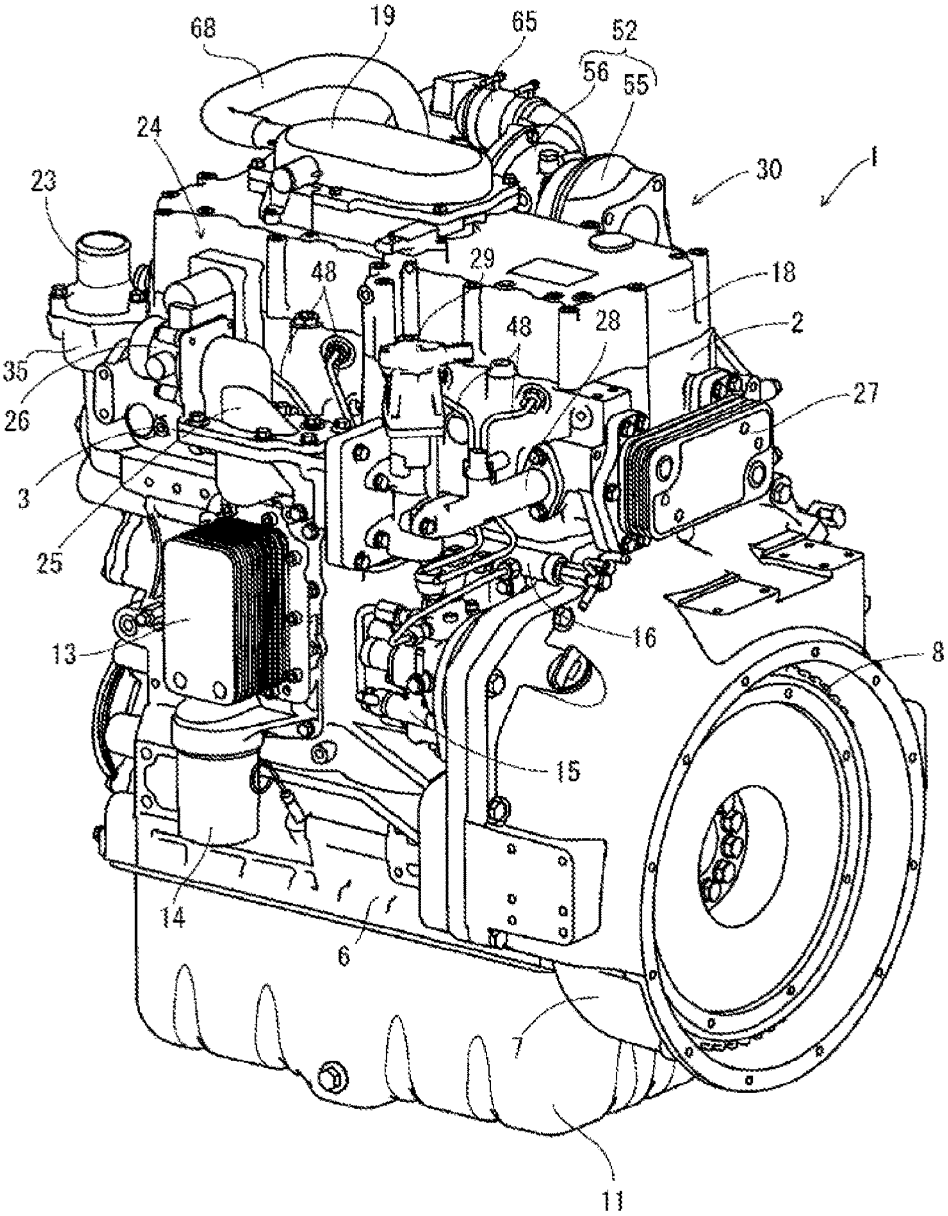
FIG. 7 A perspective view of the engine as viewed from diagonally front.
Figure 8:
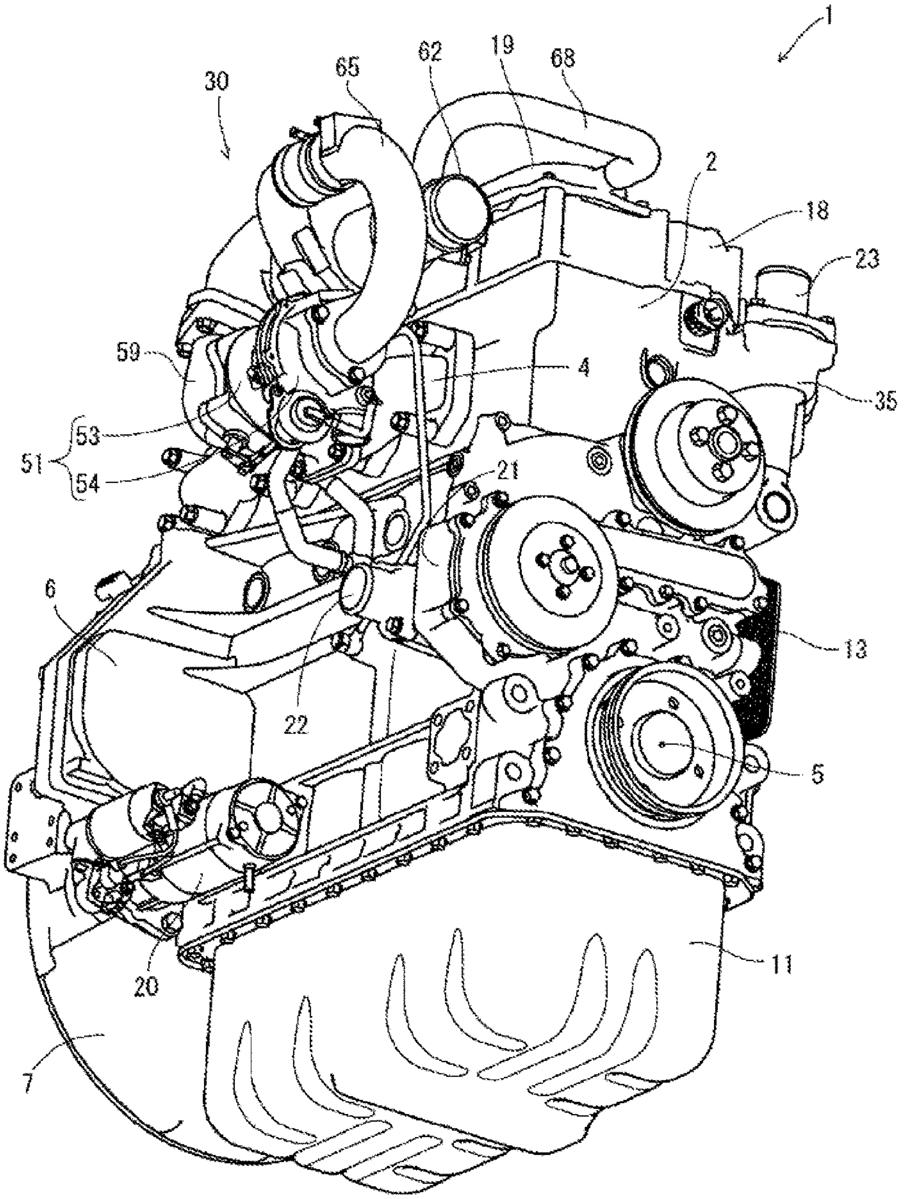
FIG. 8 A perspective view of the engine as viewed from diagonally rear.
Figure 9:
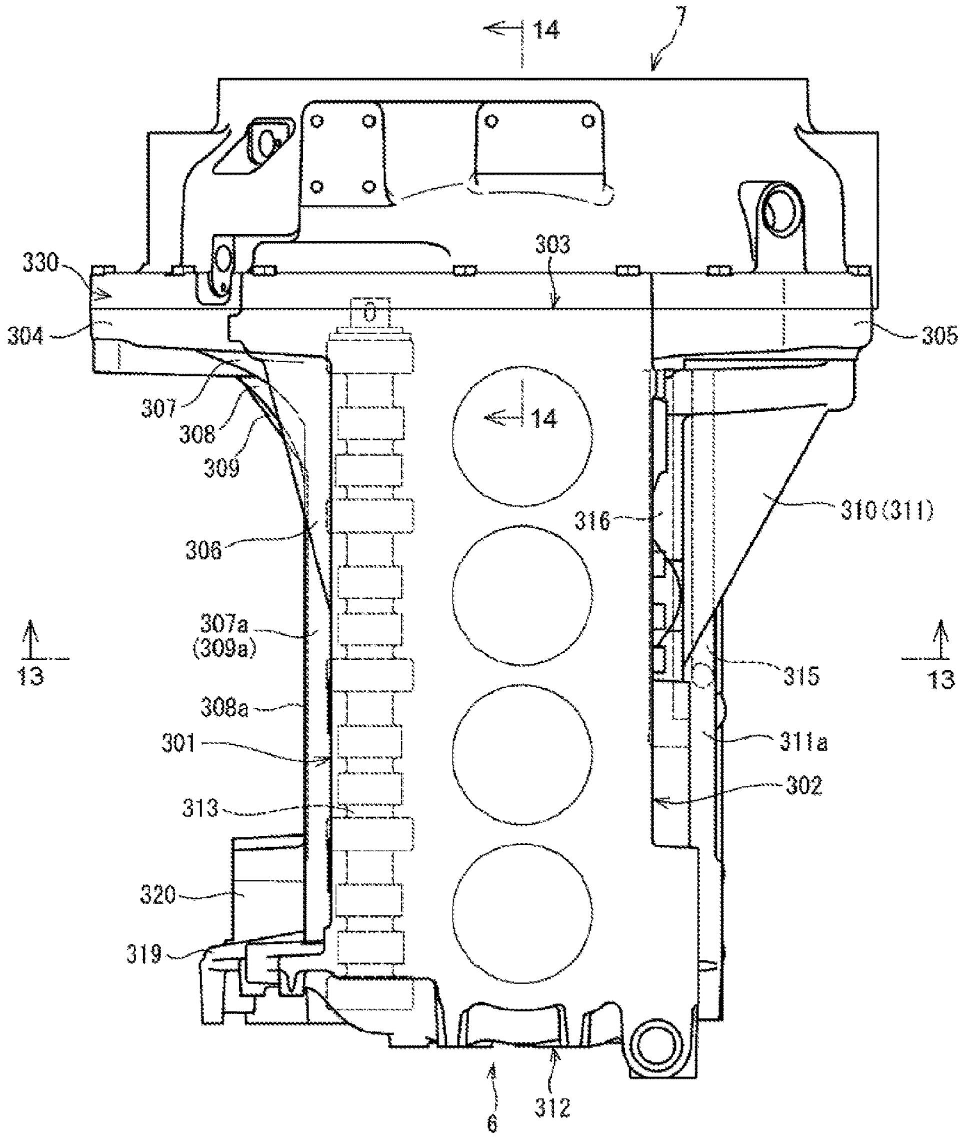
FIG. 9 A top plan view showing a cylinder block and a flywheel housing.

In the following, an embodiment of the present invention will be described with reference to the drawings. First, referring to FIG. 1 to FIG. 8, an overall structure of an engine (engine device) 1 constituted by a diesel engine will be described. In the descriptions below, opposite side portions parallel to a crankshaft 5 (side portions on opposite sides relative to the crankshaft 5) will be defined as left and right, a side where a flywheel housing 7 is disposed will be defined as front, and a side where a cooling fan 9 is disposed will be defined as rear. For convenience, these are used as a benchmark for a positional relationship of left, right, front, rear, up, and down in an engine 1.

As shown in FIG. 1 to FIG. 8, an intake manifold 3 and an exhaust manifold 4 are disposed in one side portion and the other side portion of the engine 1 parallel to the crankshaft 5. In the embodiment, the intake manifold 3 provided on a right surface of a cylinder head 2 is formed integrally with the cylinder head 2. The exhaust manifold 4 is provided on a left surface of the cylinder head 2. The cylinder head 2 is mounted on a cylinder block 6 in which the crankshaft 5 and a piston (not shown) are disposed. The cylinder block 6 pivotally supports the crankshaft 5 such that the crankshaft 5 is rotatable.

The crankshaft 5 has its front and rear distal ends protruding from front and rear surfaces of the cylinder block 6. The flywheel housing 7 is fixed to one side portion of the engine 1 (in the embodiment, a front surface side of the cylinder block 6) intersecting the crankshaft 5. A flywheel 8 is disposed in the flywheel housing 7. The flywheel 8, which is pivotally supported on the front end side of the crankshaft 5, is configured to rotate integrally with the crankshaft 5. The flywheel 8 is configured such that power of the engine 1 is extracted to an actuating part of a work machine (for example, a hydraulic shovel, a forklift, or the like) through the flywheel 8. The cooling fan 9 is disposed in the other side portion of the engine 1 (in the embodiment, a rear surface side of the cylinder block 6) intersecting the crankshaft 5. A rotational force is transmitted from the rear end side of the crankshaft 5 to the cooling fan 9 through a V-belt 10.

An oil pan 11 is disposed on a lower surface of the cylinder block 6. A lubricant is stored in the oil pan 11. The lubricant in the oil pan 11 is suctioned by an oil pump 12 (see FIG. 11) disposed on the right surface side of the cylinder block 6, the oil pump 12 being arranged in a coupling portion where the cylinder block 6 is coupled to the flywheel housing 7. The lubricant is then supplied to lubrication parts of the engine 1 through an oil cooler 13 and an oil filter 14 that are disposed on the right surface of the cylinder block 6. The lubricant supplied to the lubrication parts is then returned to the oil pan 11. The oil pump 12 is configured to be driven by rotation of the crankshaft 5.

In the coupling portion where the cylinder block 6 is coupled to the flywheel housing 7, a fuel feed pump 15 for feeding a fuel is attached. The fuel feed pump 15 is disposed below an EGR device 24. A common rail 16 is fixed to a side surface of the cylinder block 6 at a location below the intake manifold 3 of the cylinder head 2. The common rail 16 is disposed above the fuel feed pump 15. Injectors 17 (see FIG. 17) for four cylinders are provided on an upper surface of the cylinder head 2 which is covered with a head cover 18. Each of the injectors 17 has a fuel injection valve of electromagnetic-controlled type.

Each of the injectors 17 is connected to a fuel tank 118 (see FIG. 17) through the fuel feed pump 15 and the common rail 16 having a cylindrical shape. The fuel tank 118 is mounted in a work vehicle. A fuel in the fuel tank is pressure-fed from the fuel feed pump 15 to the common rail 16, so that a high-pressure fuel is stored in the common rail 16. By controlling the opening/closing of the fuel injection valves 119 (see FIG. 17) of the injectors 17, the high-pressure fuel in the common rail 16 is injected from the injectors 17 to the respective cylinders of the engine 1.

A blow-by gas recirculation device 19 is provided on an upper surface of the head cover 18 covering intake and exhaust valves (not shown), etc. disposed on the upper surface of the cylinder head 2. The blow-by gas recirculation device 19 takes in a blow-by gas that has leaked out of a combustion chamber of the engine 1 or the like toward the upper surface of the cylinder head 2. A blow-by gas outlet of the blow-by gas recirculation device 19 is in communication with an intake part of a two-stage turbocharger 30 through a recirculation hose 68. A blow-by gas, from which a lubricant component is removed in the blow-by gas recirculation device 19, is then recirculated to the intake manifold 3 via the two-stage turbocharger 30.

An engine starting starter 20 is attached to the flywheel housing 7. The starter 20 is disposed below the exhaust manifold 4. A position where the starter 20 is attached to the flywheel housing 7 is below a coupling portion where the cylinder block 6 is coupled to the flywheel housing 7.

A coolant pump 21 for circulating a coolant is provided in a portion of the rear surface of the cylinder block 6, the portion being a little left-hand. The coolant pump 21 is disposed below the cooling fan 9. Rotation of the crankshaft 5 causes the coolant pump 21 as well as the cooling fan 9 to be driven through the cooling fan driving V-belt 10. Driving the coolant pump 21 causes a coolant in a radiator (not shown) mounted in the work vehicle to be supplied to the coolant pump 21. The coolant is then supplied to the cylinder head 2 and the cylinder block 6, to cool the engine 1.

A coolant inlet pipe 22 disposed below the exhaust manifold 4 is provided on the left surface of the cylinder block 6 and is fixed at a height equal to the height of the coolant pump 21. The coolant inlet pipe 22 is in communication with a coolant outlet of the radiator. A coolant outlet pipe 23 that is in communication with a coolant inlet of the radiator is fixed to a rear portion of the cylinder head 2. The cylinder head 2 has a coolant drainage 35 that protrudes rearward from the intake manifold 3. The coolant outlet pipe 23 is provided on an upper surface of the coolant drainage 35.

The inlet side of the intake manifold 3 is coupled to an air cleaner (not shown) via a collector 25 of an EGR device 24 (exhaust-gas recirculation device) which will be described later. Fresh air (outside air) suctioned by the air cleaner is subjected to dust removal and purification in the air cleaner, then fed to the intake manifold 3 through the collector 25, and then supplied to the respective cylinders of the engine 1. In the embodiment, the collector 25 of the EGR device 24 is coupled to the right side of the intake manifold 3 which is formed integrally with the cylinder head 2 to form the right surface of the cylinder head 2. That is, an outlet opening of the collector 25 of the EGR device 24 is coupled to an inlet opening of the intake manifold 3 provided on the right surface of the cylinder head 2. In this embodiment, the collector 25 of the EGR device 24 is coupled to the air cleaner via an intercooler (not shown) and the two-stage turbocharger 30, as will be described later.

The EGR device 24 includes: the collector 25 serving as a relay pipe passage that mixes a recirculation exhaust gas of the engine 1 (an EGR gas from the exhaust manifold 4) with fresh air (outside air from the air cleaner), and supplies a mixed gas to the intake manifold 3; an intake throttle member 26 that communicates the collector 25 with the air cleaner; a recirculation exhaust gas tube 28 that constitutes a part of a recirculation flow pipe passage connected to the exhaust manifold 4 via an EGR cooler 27; and an EGR valve member 29 that communicates the collector 25 with the recirculation exhaust gas tube 28.

The EGR device 24 is disposed on the right lateral side of the intake manifold 3 in the cylinder head 2. The EGR device 24 is fixed to the right surface of the cylinder head 2, and is in communication with the intake manifold 3 in the cylinder head 2. In the EGR device 24, the collector 25 is coupled to the intake manifold 3 on the right surface of the cylinder head 2, and an EGR gas inlet of the recirculation exhaust gas tube 28 is coupled and fixed to a front portion of the intake manifold 3 on the right surface of the cylinder head 2. The EGR valve member 29 and the intake throttle member 26 are coupled to the front and rear of the collector 25, respectively. An EGR gas outlet of the recirculation exhaust gas tube 28 is coupled to the rear end of the EGR valve member 29.

The EGR cooler 27 is fixed to the front surface of the cylinder head 2. The coolant and the EGR gas flowing in the cylinder head 2 flows into and out of the EGR cooler 27. In the EGR cooler 27, the EGR gas is cooled. EGR cooler coupling bases 33, 34 for coupling the EGR cooler 27 to the front surface of the cylinder head 2 protrude from left and right portions of the front surface of the cylinder head 2. The EGR cooler 27 is coupled to the coupling bases 33, 34. That is, the EGR cooler 27 is disposed on the front side of the cylinder head 2 and at a position above the flywheel housing 7 such that a rear end surface of the EGR cooler 27 and the front surface of the cylinder head 2 are spaced from each other.

The two-stage turbocharger 30 is disposed on a lateral side (in the embodiment, the left lateral side) of the exhaust manifold 4. The two-stage turbocharger 30 includes a high-pressure turbocharger 51 and a low-pressure turbocharger 52. The high-pressure turbocharger 51 includes a high-pressure turbine 53 in which a turbine wheel (not shown) is provided and a high-pressure compressor 54 in which a blower wheel (not shown) is provided. The low-pressure turbocharger 52 includes a low-pressure turbine 55 in which a turbine wheel (not shown) is provided and a low-pressure compressor 56 in which a blower wheel (not shown) is provided.

An exhaust gas inlet 57 of the high-pressure turbine 53 is coupled to the exhaust manifold 4. An exhaust gas inlet 60 of the low-pressure turbine 55 is coupled to an exhaust gas outlet 58 of the high-pressure turbine 53 via a high-pressure exhaust gas tube 59. An exhaust gas introduction side end portion of an exhaust gas discharge pipe (not shown) is coupled to an exhaust gas outlet 61 of the low-pressure turbine 55. A fresh air supply side (fresh air outlet side) of the air cleaner (not shown) is connected to a fresh air inlet port (fresh air inlet) 63 of the low-pressure compressor 56 via an air supply pipe 62. A fresh air inlet port 66 of the high-pressure compressor 54 is coupled to a fresh air supply port (fresh air outlet) 64 of the low-pressure compressor 56 via a low-pressure fresh air passage pipe 65. A fresh air introduction side of the intercooler (not shown) is connected to a fresh air supply port 67 of the high-pressure compressor 54 via a high-pressure fresh air passage pipe (not shown).

The high-pressure turbocharger 51 is coupled to the exhaust gas outlet 58 of the exhaust manifold 4, and is fixed to the left lateral side of the exhaust manifold 4. On the other hand, the low-pressure turbocharger 52 is coupled to the high-pressure turbocharger 51 via the high-pressure exhaust gas tube 59 and the low-pressure fresh air passage pipe 65, and is fixed above the exhaust manifold 4. Thus, the exhaust manifold 4 and the high-pressure turbocharger 51 with a small diameter are disposed side-by-side with respect to the left-right direction below the low-pressure turbocharger 52 with a large diameter. As a result, the two-stage turbocharger 30 is arranged so as to surround the left surface and the upper surface of the exhaust manifold 4. That is, the exhaust manifold 4 and the two-stage turbocharger 30 are arranged so as to form a rectangular shape in a rear view (or front view), and are compactly fixed to the left surface of the cylinder head 2.

Next, referring to FIG. 9 to FIG. 13, a configuration of the cylinder block 6 will be described. The cylinder block 6 is provided with a left housing bracket portion 304 and a right housing bracket portion 305 (protruding portions) that are disposed in end portions of a left surface 301 and a right surface 302 of the cylinder block 6, the end portions being on the front surface 303 side and extending in a direction along a crankshaft center 300. The flywheel housing 7 is fixed to the left housing bracket portion 304 and the right housing bracket portion 305 with a plurality of bolts. A left-side first reinforcing rib 306, a left-side second reinforcing rib 307, a left-side third reinforcing rib 308, and a left-side fourth reinforcing rib 309, which are arranged in this order from up to down (from the top deck side to the oil pan rail side), are provided between the left housing bracket portion 304 and a side wall of the left surface 301. A right-side first reinforcing rib 310 and a right-side second reinforcing rib 311, which are arranged in this order from up to down, are disposed between the right housing bracket portion 305 and the side wall of the right surface 302. The housing bracket portions 304, 305 and the reinforcing ribs 306 to 311 are formed integrally with the cylinder block 6.

Each of the reinforcing ribs 306 to 311 extends in the direction along the crankshaft center 300. In a plan view, each of the housing bracket portions 304, 305 has a substantially wide triangular shape. The left-side reinforcing ribs 307, 308, 309 and the right-side second reinforcing rib 311 have linear portions 307 *a*, 308 *a*, 309 *a*, 311 *a* that extend from the substantially triangular portions toward a rear surface 312 of the cylinder block 6 (see FIG. 7 and FIG. 8, too). The reinforcing ribs 306, 307, 308 are disposed in a cylinder portion of the cylinder block 6. The reinforcing ribs 309, 310, 311 are disposed in a skirt portion of the cylinder block 6.

Figure 17:
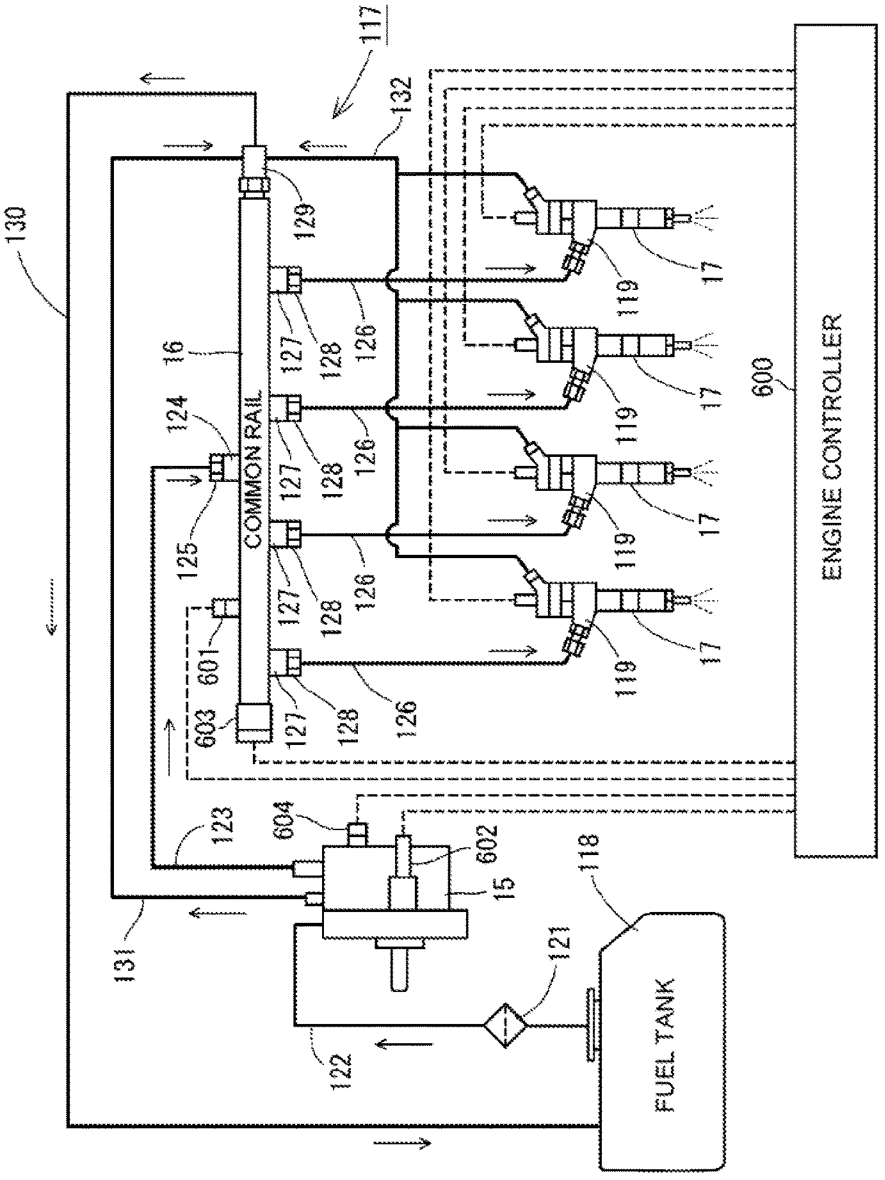
FIG. 17 A diagram illustrating an engine fuel system.

Each of the left surface 301 and the right surface 302 is provided with two mount attachment pedestals 317 for attachment of an engine mount which couples the engine 1 to a vehicle body. The two mount attachment pedestals 317 are arranged one behind the other with respect to the front-rear direction, and protrude at positions close to the oil pan rail. The left-side fourth reinforcing rib 309 is coupled to the two mount attachment pedestals 317 protruding from the left surface 301. The right-side second reinforcing rib 311 is coupled to the two mount attachment pedestals 317 protruding from the right surface 302. As shown in FIG. 17, a crank case covering member 326 is secured to the rear surface 312 of the cylinder block 6 with bolts. The crank case covering member 326 covers surroundings of the crankshaft 5 so as not to expose the inside of a crank case to the outside of the engine 1. The oil pan 11 is fastened to a lower surface of the crank case covering member 326 with at least one bolt.

The housing bracket portions 304, 305 and the reinforcing ribs 306 to 311 which are formed integrally with the cylinder block 6 contribute to enhancement of the rigidity of the cylinder block 6, and particularly the rigidity and strength of a portion of the cylinder block 6 near the front surface 303. Thus, vibration and noise of the engine 1 can be reduced. In addition, since the housing bracket portions 304, 305 and the reinforcing ribs 306 to 311 contribute to an increase in a surface area of the cylinder block 6, the cooling efficiency of the cylinder block 6 can be enhanced, and therefore the cooling efficiency of the engine 1 can be enhanced.

A coolant pump attaching part 319 and an inlet pipe attachment pedestal 320 are provided so as to protrude from a portion of the left surface 301 of the cylinder block 6, the portion being relatively close to the rear surface 312. To the coolant pump attaching part 319, a coolant pump 21 (see FIG. 2, etc.) is attached. To the inlet pipe attachment pedestal 320, the coolant inlet pipe 22 (see FIG. 3, etc.) is attached. The coolant pump attaching part 319 and the inlet pipe attachment pedestal 320 are formed integrally with the cylinder block 6. A portion of the inlet pipe attachment pedestal 320 close to the rear surface 312 is coupled to the coolant pump attaching part 319. The coolant pump attaching part 319 and the inlet pipe attachment pedestal 320 protrude in a direction away from the crankshaft 5, and can enhance the rigidity, the strength, and the cooling efficiency of the cylinder block 6.

A camshaft casing 314 (see FIG. 13) for accommodating a camshaft 313 is provided inside the cylinder block 6. Although details are omitted, a crank gear 331 fixed to the crankshaft 5 and a cam gear 332 fixed to the camshaft 313 are disposed on the front surface 303 of the cylinder block 6. The cam gear 332 and the camshaft 313 are rotated in conjunction with the crank gear 331. Driving a valve mechanism (not shown) that is associated with the camshaft 313 causes an intake valve and an exhaust valve (not shown) of the engine 1 to be opened or closed. The engine 1 of this embodiment has a so-called overhead valve system.

The camshaft casing 314 is disposed in the cylinder portion of the cylinder block 6, and is arranged at a position relatively close to the left surface 301. The camshaft 313 and the camshaft casing 314 are disposed in the direction along the crankshaft center 300. Substantially triangular portions and the linear portions 307 *a*, 308 *a* of the left-side second reinforcing rib 307 and the left-side third reinforcing rib 308 provided on the left surface 301 of the cylinder block 6 are arranged close to a position where the camshaft casing 314 is disposed in a side view, and more specifically at a position overlapping the position where the camshaft casing 314 is disposed.

This embodiment, in which the rigidity of the camshaft casing 314 and therearound is enhanced by the left-side second reinforcing rib 307 and the left-side third reinforcing rib 308, can prevent distortion of the camshaft casing 314. Accordingly, a variation in the rotation resistance and the rotational friction of the camshaft 313, which may occur due to distortion of the camshaft casing 314, can be prevented, so that the camshaft 313 can be rotated appropriately to open or close the intake valve and the exhaust valve (not shown) appropriately.

Of a lubricant passage provided in the cylinder block 6, a part is disposed in the skirt portion of the cylinder block 6 and arranged at a position relatively close to the right surface 302. The part includes a lubricant sucking passage 315 and a lubricant supply passage 316. The lubricant supply passage 316 is disposed in the skirt portion of the cylinder block 6 and arranged at a position relatively close to the cylinder portion. The lubricant sucking passage 315 is arranged at a position relatively close to the oil pan rail as compared to the lubricant supply passage 316.

One end of the lubricant sucking passage 315 is opened in an oil pan rail lower surface (a surface opposed to the oil pan 11) of the cylinder block 6, and is connected to a lubricant sucking pipe (not shown) disposed in the oil pan 11. The other end of the lubricant sucking passage 315 is opened in the front surface 303 of the cylinder block 6, and is connected to a suction port of the oil pump 12 (see FIG. 11) fixed to the front surface 303. One end of the lubricant supply passage 316 is opened in the front surface 303 of the cylinder block 6 at a position different from the position where the lubricant sucking passage 315 is opened, and is connected to an ejection port of the oil pump 12. The other end of the lubricant supply passage 316 is opened in an oil cooler bracket attachment pedestal 318 protruding from the right surface 302 of the cylinder block 6, and is connected to a suction port of the oil cooler 13 (see FIG. 4, etc.) disposed on the oil cooler bracket attachment pedestal 318. Not only the lubricant sucking passage 315 and the lubricant supply passage 316 but also other lubricant passages are provided in the cylinder block 6.

On the right surface 302 of the cylinder block 6, the right-side first reinforcing rib 310 is arranged close to the position where the lubricant supply passage 316 is arranged in a side view. More specifically, the right-side first reinforcing rib 310 is arranged so as to overlap the position where the lubricant supply passage 316 is arranged in a side view. The right-side second reinforcing rib 311 is arranged close to the position where the lubricant sucking passage 315 is arranged in a side view. The reinforcing ribs 310, 311 and the passages 315, 316 extend in the direction along the crankshaft center 300.

In this embodiment, the cooling efficiency in the vicinity of the lubricant sucking passage 315, the oil pump 12, and the lubricant supply passage 316 can be enhanced by the right housing bracket portion 305, the right-side first reinforcing rib 310, and the right-side second reinforcing rib 311. In particular, the right-side first reinforcing rib 310 arranged at a position overlapping the lubricant supply passage 316 in a side view efficiently dissipates heat in the vicinity of the lubricant supply passage 316 to the outside. This can lower the temperature of the lubricant flowing into the oil cooler 13, and can reduce the amount of heat exchange required of the oil cooler 13.

A gear train structure of the engine 1 will now be described with reference to FIG. 10 to FIG. 16. A gear case 330 is provided in a space surrounded by the front surface 303 of the cylinder block 6, the housing bracket portions 304, 305, and the flywheel housing 7. As shown in FIG. 12 and FIG. 14, front distal end portions of the crankshaft 5 and the camshaft 313 protrude from the front surface 303 of the cylinder block 6. The crank gear 331 is secured to the front distal end portion of the crankshaft 5. The cam gear 332 is secured to the front distal end portion of the camshaft 313. A disk-shaped camshaft pulser 339 is fastened with bolts to a surface of the cam gear 332 on the flywheel housing 7 side such that the camshaft pulser 339 is rotatable integrally with the cam gear 332.

Figure 12:
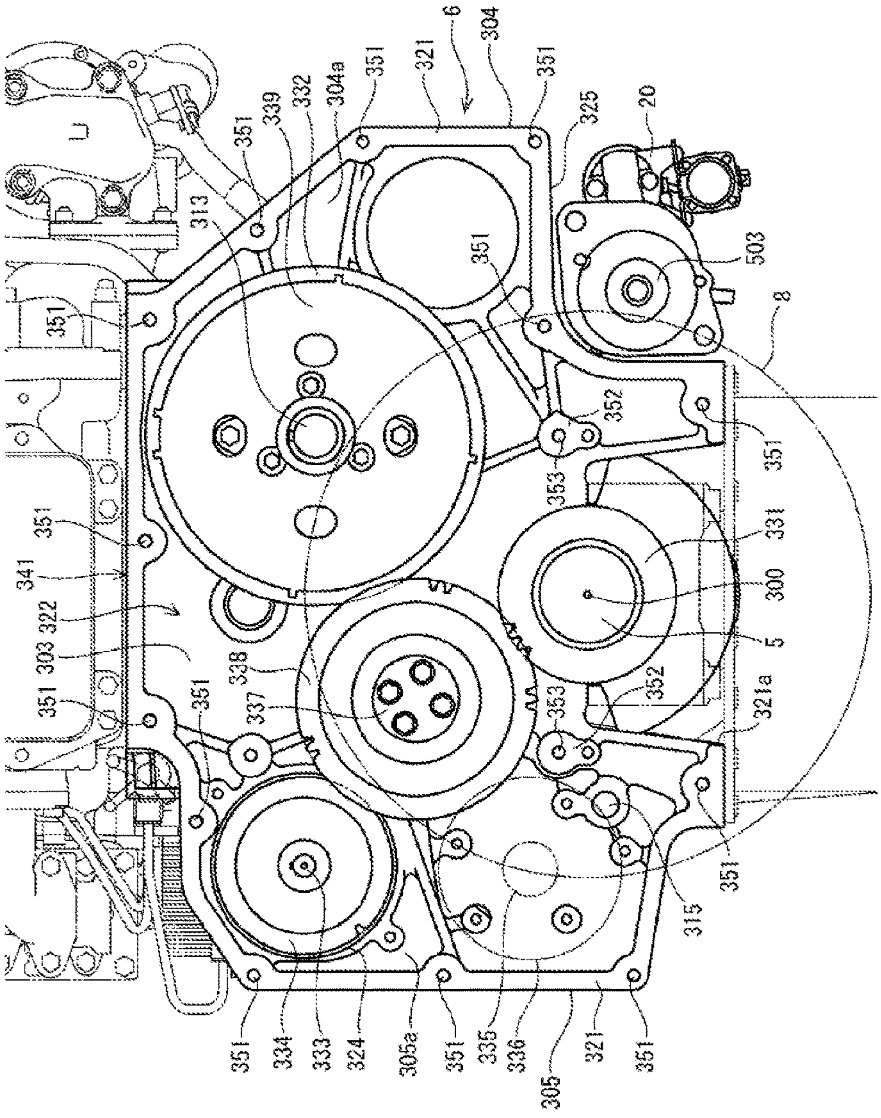
FIG. 12 A front view showing a gear train.
Figure 13:
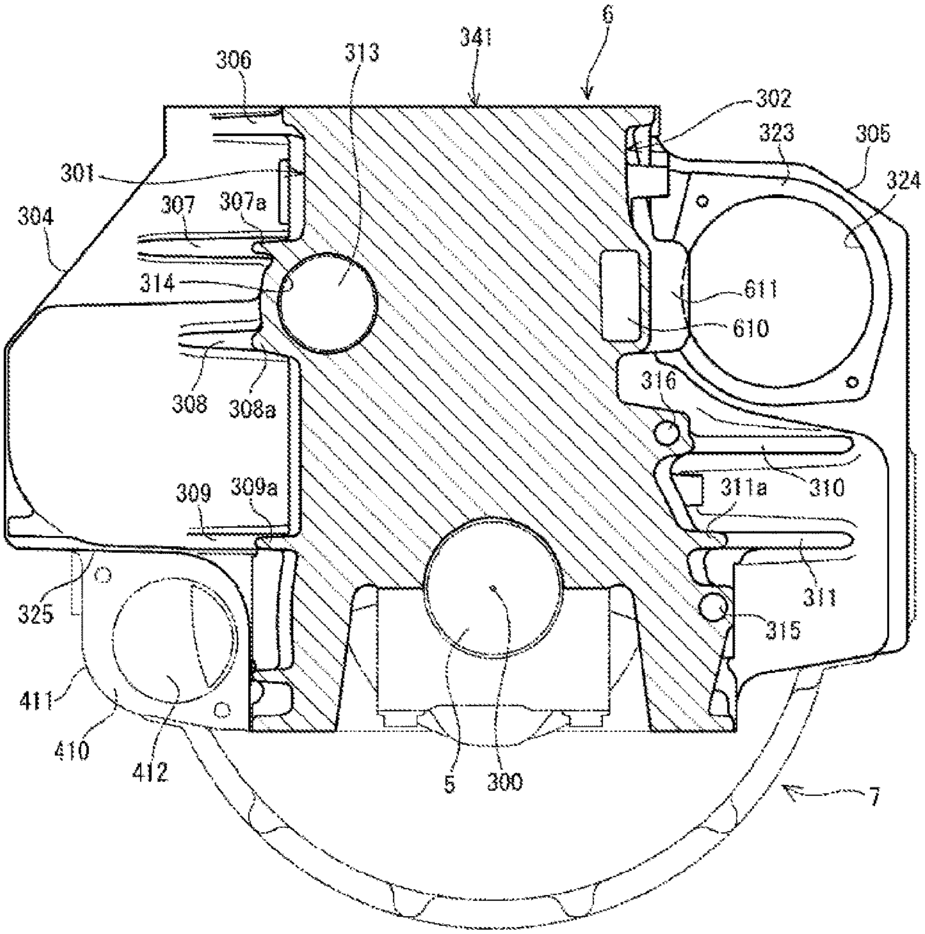
FIG. 13 A cross-sectional view taken along the line 13-13 in FIG. 9.
Figure 14:
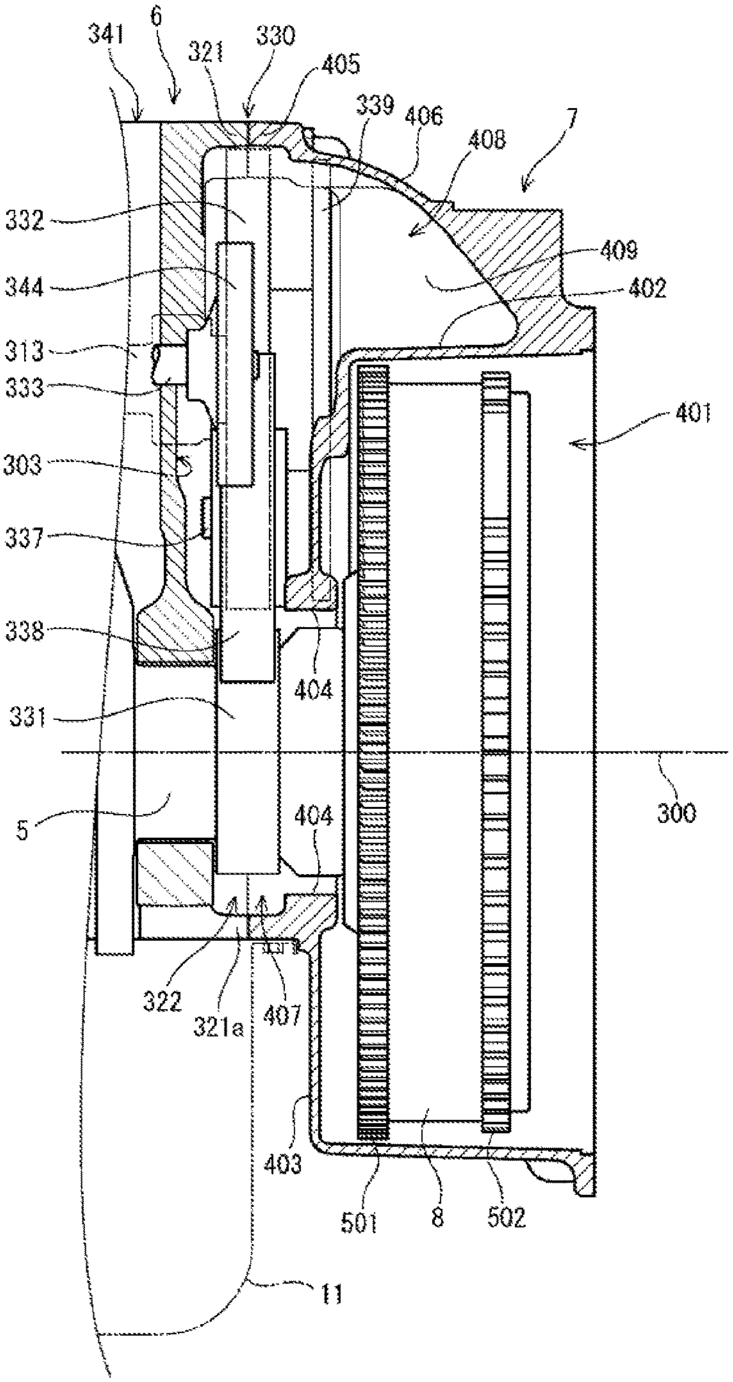
FIG. 14 A cross-sectional view taken along the line 14-14 in FIG. 9.
Figure 16:
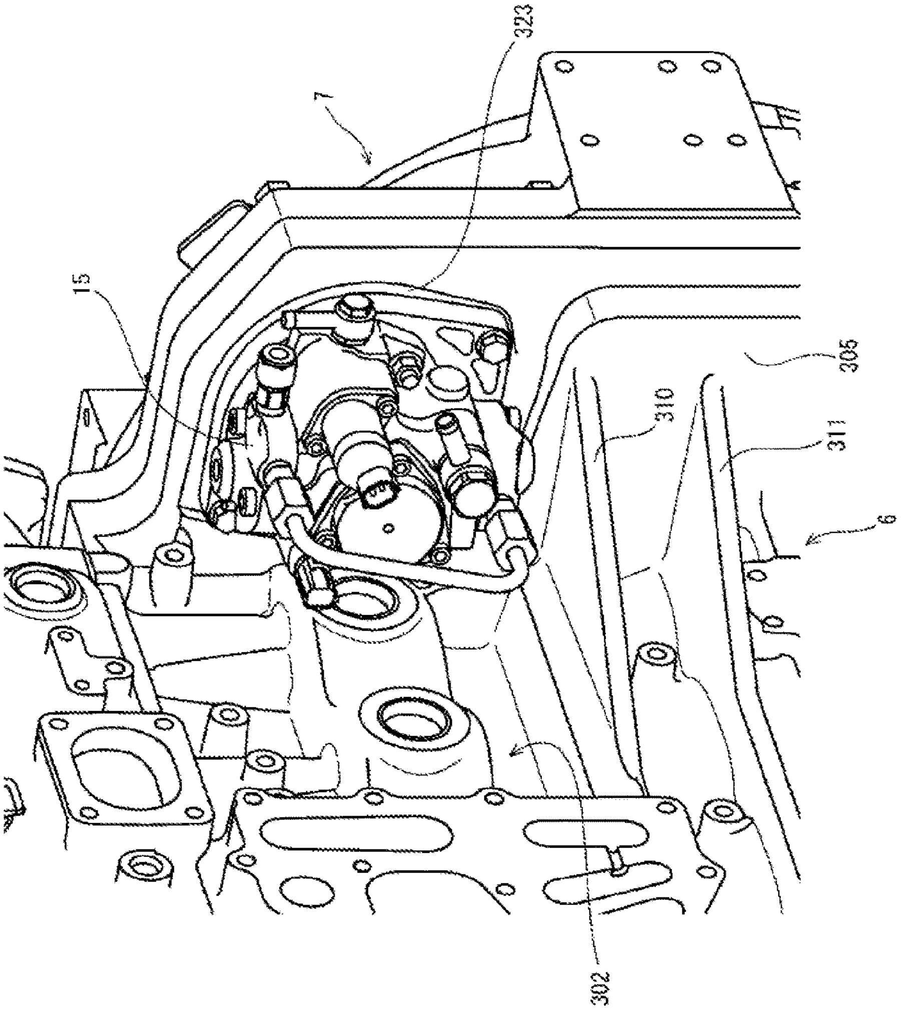
FIG. 16 A perspective view showing a position where a fuel feed pump is attached.

As shown in FIG. 12, FIG. 13, and FIG. 16, the fuel feed pump 15 provided in the right housing bracket portion 305 of the cylinder block 6 includes a fuel feed pump shaft 333 as a rotation shaft extending in parallel to the rotation axis of the crankshaft 5. The front end side of the fuel feed pump shaft 333 protrudes from a front surface 305 *a* of the right housing bracket portion 305. A fuel feed pump gear 334 is secured to a front distal end portion of the fuel feed pump shaft 333. As shown in FIG. 13, the right housing bracket portion 305 of the cylinder block 6 includes a fuel feed pump attachment pedestal 323 for arranging the fuel feed pump 15 above the right-side first reinforcing rib 310. The fuel feed pump attachment pedestal 323 has a fuel feed pump shaft insertion hole 324 with a size that allows the fuel feed pump gear 334 to pass therethrough.

Figure 11:
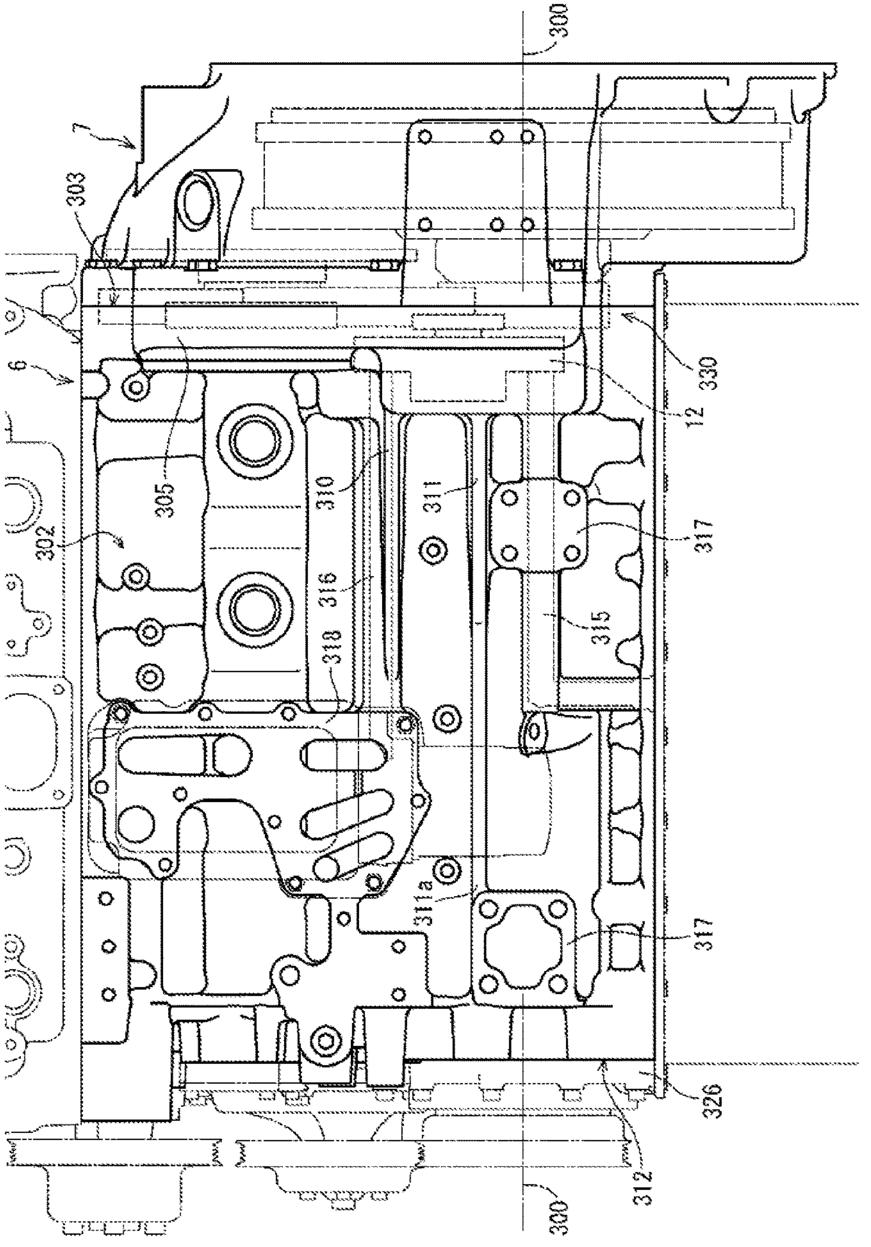
FIG. 11 A right side view showing the cylinder block and the flywheel housing.

As shown in FIG. 11 and FIG. 12, the oil pump 12, which is disposed on the front surface 305 *a* of the right housing bracket portion 305 and arranged below the fuel feed pump gear 334, includes an oil pump shaft 335 as a rotation shaft extending in parallel to the rotation axis of the crankshaft 5. An oil pump gear 336 is secured to a front distal end portion of the oil pump shaft 335.

On the front surface 303 of the cylinder block 6, an idle shaft 337 extending in parallel to the rotation axis of the crankshaft 5 is provided in a portion surrounded by the crankshaft 5, the camshaft 313, the fuel feed pump shaft 333, and the oil pump shaft 335. The idle shaft 337 is fixed to the front surface 303 of the cylinder block 6. An idle gear 338 is rotatably supported on the idle shaft 337.

The idle gear 338 is meshed with four gears, namely, the crank gear 331, the cam gear 332, the fuel feed pump gear 334, and the oil pump gear 336. Rotational power of the crankshaft 5 is transmitted from the crank gear 331 to the three gears of the cam gear 332, the fuel feed pump gear 334, and the oil pump gear 336, via the idle gear 338. Thus, the camshaft 313, the fuel feed pump shaft 333, and the oil pump shaft 335 are rotated in conjunction with the crankshaft 5. In the embodiment, the gear ratio among the gears 331, 332, 334, 336, 338 is set such that: two rotations of the crankshaft 5 correspond to one rotation of the camshaft 313; and one rotation of the crankshaft 5 corresponds to one rotation of the fuel feed pump shaft 333 and the oil pump shaft 335.

In this configuration, rotating the cam gear 332 and the camshaft 313 in conjunction with the crank gear 331 which rotates together with the crankshaft 5 to drive the valve mechanism (not shown) that is associated with the camshaft 313 causes the intake valve and the exhaust valve (not shown) provided in the cylinder head 2 to be opened or closed. In addition, rotating the fuel feed pump gear 334 and the fuel feed pump shaft 333 in conjunction with the crank gear 331 to drive the fuel feed pump 15 causes the fuel in the fuel tank 118 to be pressure-fed to the common rail 16 so that a high-pressure fuel is stored in the common rail 16. In addition, rotating the oil pump gear 336 and the oil pump shaft 335 in conjunction with the crank gear 331 to drive the oil pump 12 causes the lubricant in the oil pan 11 to be supplied to various sliding component parts and the like through a lubricating system circuit (details are not shown) including the lubricant sucking passage 315, the lubricant supply passage 316, the oil cooler 13, the oil filter 14, and the like.

As shown in FIG. 16, the fuel feed pump 15 serving as an auxiliary machine that is operated in conjunction with rotation of the crankshaft 5 is secured with bolts to the fuel feed pump attachment pedestal 323 of the right housing bracket portion 305. The right-side first reinforcing rib 310 is arranged close to the fuel feed pump attachment pedestal 323. The right-side first reinforcing rib 310 is arranged directly under the fuel feed pump 15, and the right-side second reinforcing rib 311 is arranged directly under the right-side first reinforcing rib 310. The reinforcing ribs 310, 311 can enhance the rigidity of the fuel feed pump attachment pedestal 323, and also can prevent the fuel feed pump 15 from being contacted by a foreign object such as muddy water or stone coming from below, for protection of the fuel feed pump 15.

The gear case 330 that accommodates the gear train will now be described with reference to FIG. 10 to FIG. 12, FIG. 14, and FIG. 15. A block-side projecting portion 321 that extends along a peripheral edge of a region including the front surfaces 303, 304 *a*, 305 *a* of the cylinder block 6 and of the left and right housing bracket portions 304, 305 is provided upright on a peripheral edge portion of the front surfaces 303, 304 *a*, 305*a*. The block-side projecting portion 321 is joined with the flywheel housing 7. The block-side projecting portion 321 has a cutout portion 321 *a* at a location between the left and right oil pan rails of the cylinder block 6. A space between an end surface of the block-side projecting portion 321 and the front surfaces 303, 304 *a*, 305 *a* in a side view defines a block-side gear casing 322.

Figure 15:
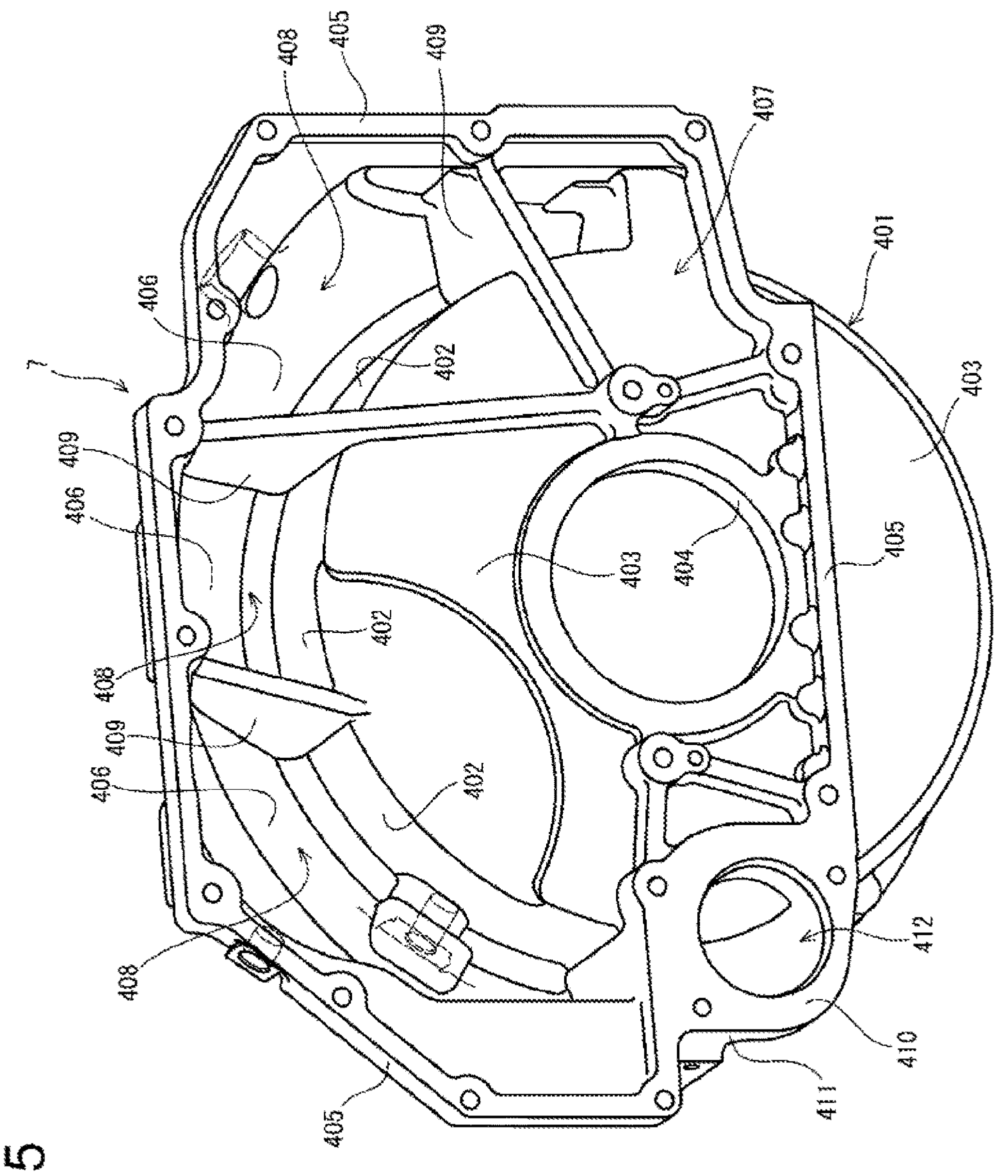
FIG. 15 A perspective view showing inside of the flywheel housing.

As shown in FIG. 14 and FIG. 15, the flywheel housing 7 which is made of, for example, cast iron includes a flywheel accommodating part 401 that accommodates the flywheel 8. The flywheel accommodating part 401 has a bottomed cylindrical shape formed by a circumferential wall surface portion 402 and a rear wall surface portion 403 being coupled to each other. The circumferential wall surface portion 402 has a substantially cylindrical shape and covers the outer circumferential side of the flywheel 8. The rear wall surface portion 403 covers a rear surface side (a surface on the cylinder block 6 side) of the flywheel 8. The flywheel 8 is accommodated in a space surrounded by the circumferential wall surface portion 402 and the rear wall surface portion 403. The circumferential wall surface portion 402 is in the shape of a substantially truncated cone with its radius decreasing toward the rear wall surface portion 403. The rear wall surface portion 403 has, in its central portion, a crankshaft insertion hole 404 through which the crankshaft 5 is inserted.

A housing-side projecting portion 405 having an annular shape that corresponds to the shape of the block-side projecting portion 321 of the cylinder block 6 is coupled to the rear wall surface portion 403 so as to surround a position where the crankshaft insertion hole 404 is disposed. The center of the housing-side projecting portion 405 is deviated upward from the crankshaft insertion hole 404. A lower portion of the housing-side projecting portion 405, which extends in the left-right direction (lateral direction), is close to the crankshaft insertion hole 404 and is coupled to the rear wall surface portion 403.

Upper, left, and right portions of the housing-side projecting portion 405 are located outside the rear wall surface portion 403. A front portion of the circumferential wall surface portion 402 and a front portion of the housing-side projecting portion 405 located outside the rear wall surface portion 403 are coupled to each other in an outer wall portion 406. The outer wall portion 406 has a curved slope shape convexing in a direction away from the crankshaft 5. In the flywheel housing 7, a lower portion of the flywheel accommodating part 401 protrudes from the housing-side projecting portion 405 in a direction away from the crankshaft 5.

A space between the rear wall surface portion 403 and an end surface of the housing-side projecting portion 405 in a side view defines a housing-side gear casing 407. This housing-side gear casing 407 and the above-mentioned block-side gear casing 322 constitute the gear case 330.

Inside the flywheel housing 7, a lightening space 408 is formed between an outer wall of the circumferential wall surface portion 402 of the flywheel accommodating part 401 and an inner wall of the outer wall portion 406. A plurality of ribs 409 configured to couple the circumferential wall surface portion 402 to the outer wall portion 406 are disposed in the lightening space 408. The flywheel housing 7 has a starter attaching part 411 having a starter attachment pedestal 410 that is flush with the housing-side projecting portion 405. The starter attachment pedestal 410 is coupled to the circumferential wall surface portion 402 and the housing-side projecting portion 405 at a location outside the housing-side projecting portion 405. The starter attaching part 411 has a through hole 412 bored from the starter attachment pedestal 410 to the inner wall of the circumferential wall surface portion 402. The flywheel housing 7 is fastened to the front surface 303 side of the cylinder block 6 with bolts in thirteen bolt holes 351 of the block-side projecting portion 321 of the cylinder block 6 and in bolt holes 353 of two housing bolting boss portions 352 of the front surface 303.

Figure 10:
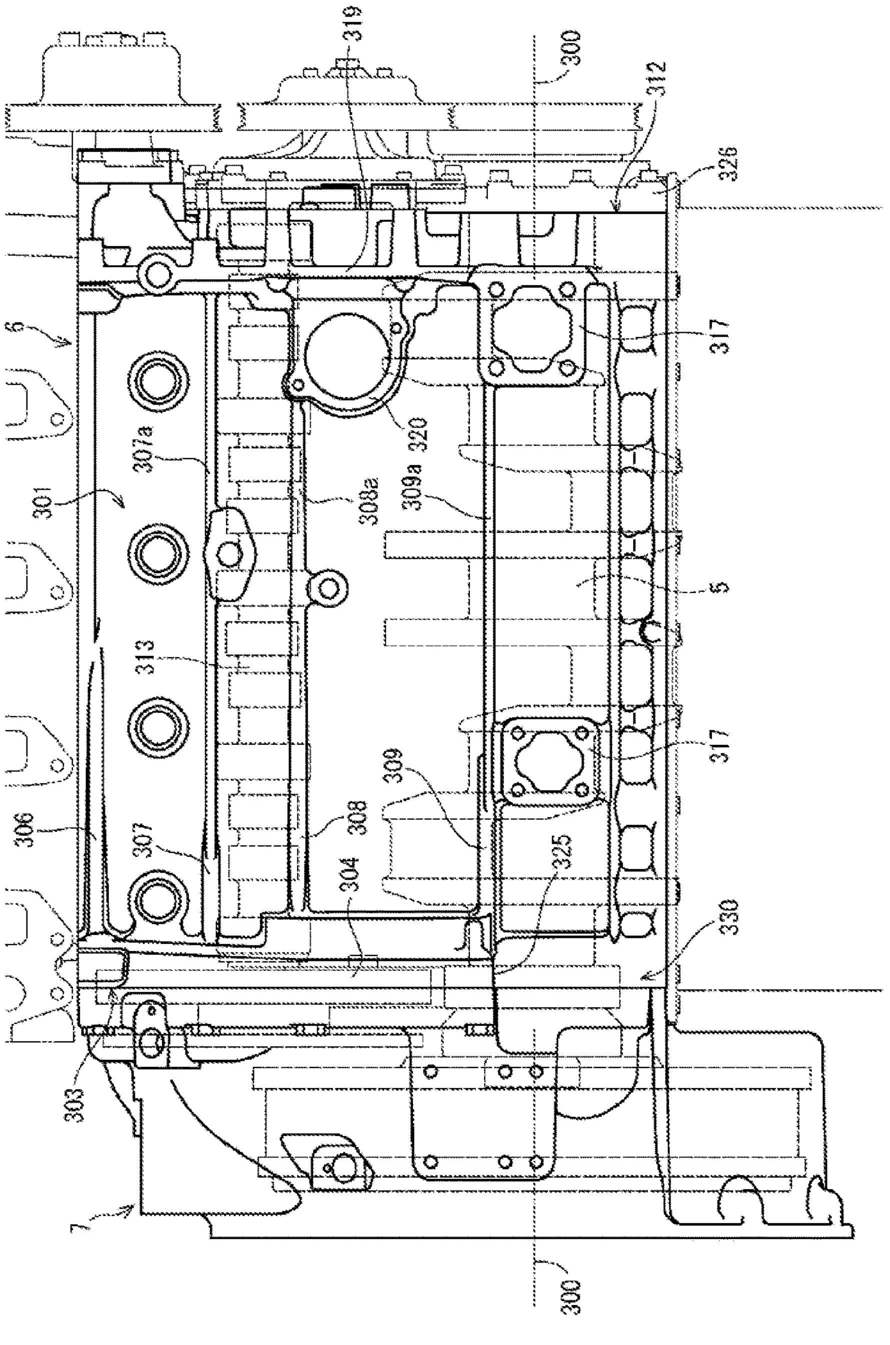
FIG. 10 A left side view showing the cylinder block and the flywheel housing.

As shown in FIG. 10, FIG. 12, and FIG. 13, the left housing bracket portion 304 of the cylinder block 6 has its peripheral edge portion recessed toward a peripheral edge portion of the flywheel housing 7, to form a bracket recessed portion 325 having a recessed shape. While the flywheel housing 7 is fixed to the cylinder block 6, the starter 20 is disposed to the starter attachment pedestal 410 of the flywheel housing 7 which is exposed on the lower side of the bracket recessed portion 325. As shown in FIG. 14, an annular ring gear 501 for the starter 20 and a crankshaft pulser 502 are fixed to the outer circumferential side of the flywheel 8. The ring gear 501 and the crankshaft pulser 502 are fitted in from opposite sides in a thickness direction of the flywheel 8. The starter 20 includes a pinion gear 503 (see FIG. 12) that is disposed in the through hole 412 and is separatably meshed with the ring gear 501.

In the vicinity of the starter attachment pedestal 410, the flywheel housing 7 made of cast iron is fastened with bolts to the block-side projecting portion 321 (see FIG. 12 and FIG. 14) that is provided upright on the peripheral edge portion of the front surface 304 *a* of the left housing bracket portion 304. In the cylinder block 6, the left-side fourth reinforcing rib 309 that couples the left housing bracket portion 304 to the left surface 301 is disposed near the bracket recessed portion 325 of the left housing bracket portion 304 which is provided near the starter attachment pedestal 410. Thereby, the rigidity of the starter attachment pedestal 410 and therearound is enhanced. In addition, the bracket recessed portion 325 of the left housing bracket portion 304 and a portion of the block-side projecting portion 321 (see FIG. 12) provided on the front surface 303 and near the starter attachment pedestal 410 so as to be continuous with the bracket recessed portion 325 also enhance the rigidity of the starter attachment pedestal 410 and therearound.

In this embodiment, the starter 20 can be attached to a portion given a high rigidity by the left-side fourth reinforcing rib 309 and the like. Thus, mispositioning and deformation of the starter 20 can be prevented, which may otherwise be caused by distortion of the starter attachment pedestal 410 or the left housing bracket portion 304. Accordingly, breakdown of the starter 20 and poor meshing between the pinion gear 503 of the starter 20 and the ring gear 501 of the flywheel 8 can be prevented.

A fuel system structure of a common rail system 117 and the engine 1 will now be described with reference to FIG. 17. As shown in FIG. 17, the fuel tank 118 is connected to the respective injectors 17 corresponding to four cylinders provided in the engine 1 through the fuel feed pump 15 and the common rail system 117. Each injector 17 has the fuel injection valve 119 of electromagnetic-controlled type. The common rail system 117 includes the common rail 16 having a cylindrical shape. The common rail 16 is provided on the right surface 302 of the cylinder block 6, and is disposed near the intake manifold 3.

The fuel tank 118 is connected to a suction side of the fuel feed pump 15 with interposition of a fuel filter 121 and a low-pressure tube 122. A fuel in the fuel tank 118 is suctioned into the fuel feed pump 15 through the fuel filter 121 and the low-pressure tube 122. Meanwhile, the common rail 16 is connected to an ejection side of the fuel feed pump 15 with interposition of a high-pressure tube 123. A high-pressure tube connector 124 is disposed longitudinally mid-way in the cylindrical common rail 16. An end portion of the high-pressure tube 123 is coupled to the high-pressure tube connector 124 by screwing with a high-pressure tube connector nut 125.

The injectors 17 corresponding to four cylinders are connected to the common rail 16 with interposition of four fuel injection pipes 126, respectively. Fuel injection pipe connectors 127 corresponding to four cylinders are arranged in a longitudinal direction of the cylindrical common rail 16. An end portion of each fuel injection pipe 126 is coupled to the corresponding fuel injection pipe connector 127 by screwing with a fuel injection pipe connector nut 128.

A return pipe connector 129 (pipe joint member) for returning a surplus fuel, which limits a fuel pressure in the common rail 16, is connected to a longitudinal end portion of the common rail 16. The return pipe connector 129 is connected to the fuel tank 118 through a fuel return pipe 130. A surplus fuel in the fuel feed pump 15 is fed to the return pipe connector 129 through a pump surplus fuel return pipe 131. A surplus fuel in each injector 17 is fed to the return pipe connector 129 through an injector surplus fuel return pipe 132. That is, the surplus fuel in the fuel feed pump 15, a surplus fuel in the common rail 16, and the surplus fuel in each injector 17 are merged in the return pipe connector 129, and then collected to the fuel tank 118 through the fuel return pipe 130. Here, it may be possible that the return pipe connector 129 is connected to the fuel tank 118 via a pipe joint member (not shown) for returning a filter surplus fuel, the pipe joint member being provided in the fuel filter 121.

A fuel pressure sensor 601 that detects a fuel pressure in the common rail 16 is provided in an end portion of the common rail 16 opposite to the end portion thereof having the return pipe connector 129. Under control by an engine controller 600, the degree of opening of a suction metering valve 602 of the fuel feed pump 15 is adjusted, while the fuel pressure in the common rail 16 is monitored based on an output of the fuel pressure sensor 601. Thereby, with adjustment of the amount of fuel suctioned by the fuel feed pump 15, and thus with adjustment of the amount of fuel ejected by the fuel feed pump 15, the fuel in the fuel tank 118 is pressure-fed to the common rail 16 by the fuel feed pump 15, so that a high-pressure fuel is stored in the common rail 16. Under control by the engine controller 600, opening/closing of each of the fuel injection valves 119 is controlled, so that the high-pressure fuel in the common rail 16 is injected from each injector 17 to each cylinder of the engine 1. That is, by electronically controlling each fuel injection valve 119, an injection pressure, an injection timing, and an injection period (injection amount) of the fuel supplied from each injector 17 can be controlled with a high accuracy. Accordingly, a nitrogen oxide (NOx) discharged from the engine 1 can be reduced. Noise and vibration of the engine 1 can be reduced. A pressure reducing valve 603 of electromagnetic-driven type for adjusting a pressure in the common rail 16 and a fuel temperature sensor 604 for detecting a fuel temperature in the fuel feed pump 15 are also electrically connected to the engine controller 600. Other devices as exemplified by various sensors provided in the engine 1 are also electrically connected to the engine controller 600, though not shown.

Figure 18:
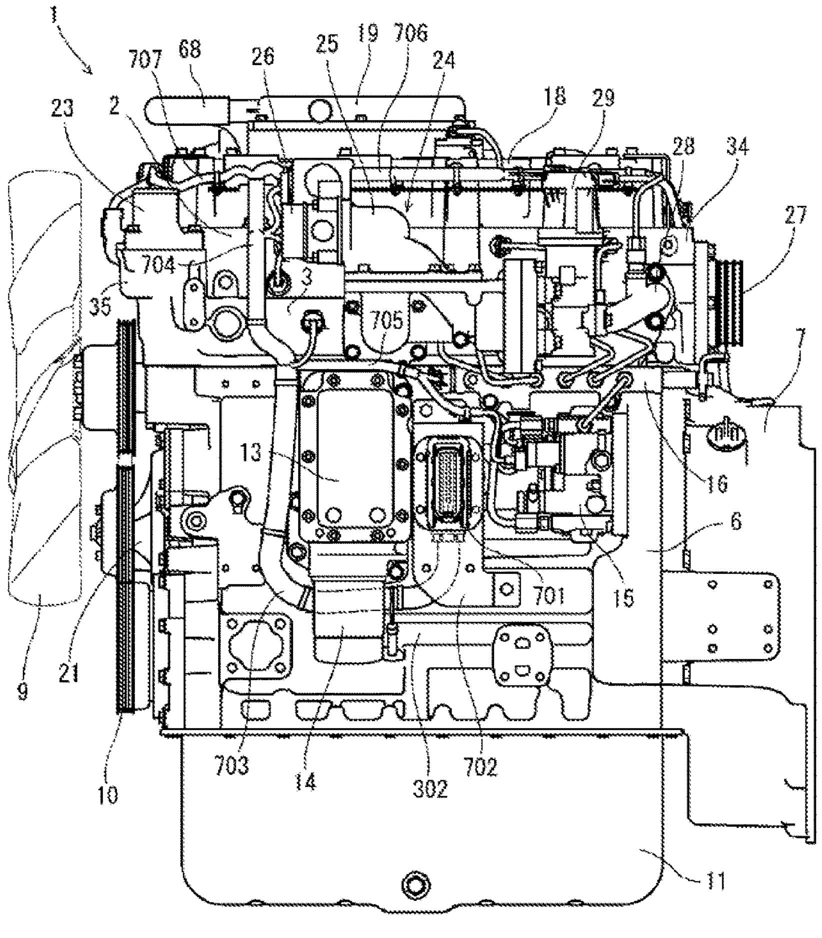
FIG. 18 A right side view showing a harness.

A part of a harness structure which is annexed to the engine 1 will now be described with reference to FIG. 18. A harness connector 701 that connects component parts of the engine 1 to the engine controller 600 (see FIG. 17) and to a battery (not shown) is fixed to the right surface 302 of the cylinder block 6 with a harness bracket 702 interposed therebetween. The harness connector 701 and the harness bracket 702 are disposed in a region surrounded by the oil cooler 13, the oil filter 14, the fuel feed pump 15, and the common rail 16.

A main harness assembly 703 extending from the harness connector 701 is guided through a space between the right surface 302 of the cylinder block 6 and the harness bracket 702 to a lower region in the engine 1, and then is guided along the linear portion 311 *a* of the right-side second reinforcing rib 311, through a space between the right surface 302 and the oil filter 14, toward a rear region in the engine 1. Furthermore, at a location more rearward in the engine 1 than the oil filter 14, the main harness assembly 703 is bent upward in the engine 1, and is guided through the rear side of the oil cooler 13 in the engine 1, toward the cylinder head 2.

The main harness assembly 703 is, in the vicinity of a joining surface where the cylinder head 2 and the cylinder block 6 are joined to each other, branched into an intake/exhaust system harness assembly 704 and a fuel system harness assembly 705. The intake/exhaust system harness assembly 704 is guided along the right surface of the cylinder head 2 toward the upper side in the engine 1, and in the vicinity of an upper portion of the right surface of the head cover 18 relatively close to the rear side, branched into an intake system harness assembly 706 and an exhaust system harness assembly 707. The intake system harness assembly 706 is guided along the right surface of the head cover 18, toward a front region in the engine 1. The exhaust system harness assembly 707 is guided along the right surface and the rear surface of the head cover 18, toward a left region in the engine 1.

The fuel system harness assembly 705 is guided through a space between the oil cooler 13 and the collector 25 of the EGR device 24, toward a front region in the engine 1, and is branched into harnesses connected to the fuel pressure sensor 601 and the pressure reducing valve 603 of the common rail 16 and to the suction metering valve 602 and the fuel temperature sensor 604 of the fuel feed pump 15 shown in FIG. 17.

A layout of the common rail 16 and therearound will be described with reference to FIG. 19 to FIG. 23. The common rail 16 having a substantially cylindrical shape is attached to an upper portion of the right surface 302 of the cylinder block 6 relatively close to the front side such that a longitudinal direction of the common rail 16 is along the crankshaft center 300 (see FIG. 11). The common rail 16 is disposed on the right surface of the cylinder head 2, at a location below the intake manifold 3 which is formed integrally with the cylinder head 2. A front end portion (one end portion) of the common rail 16 is arranged on the gear case 330 and on the flywheel housing 7. The common rail 16 includes, in its front end portion, the return pipe connector 129 (pipe joint member) for returning a surplus fuel, the return pipe connector 129 limiting a fuel pressure in the common rail 16. For example, the return pipe connector 129 is arranged on the flywheel housing 7.

Figure 19:
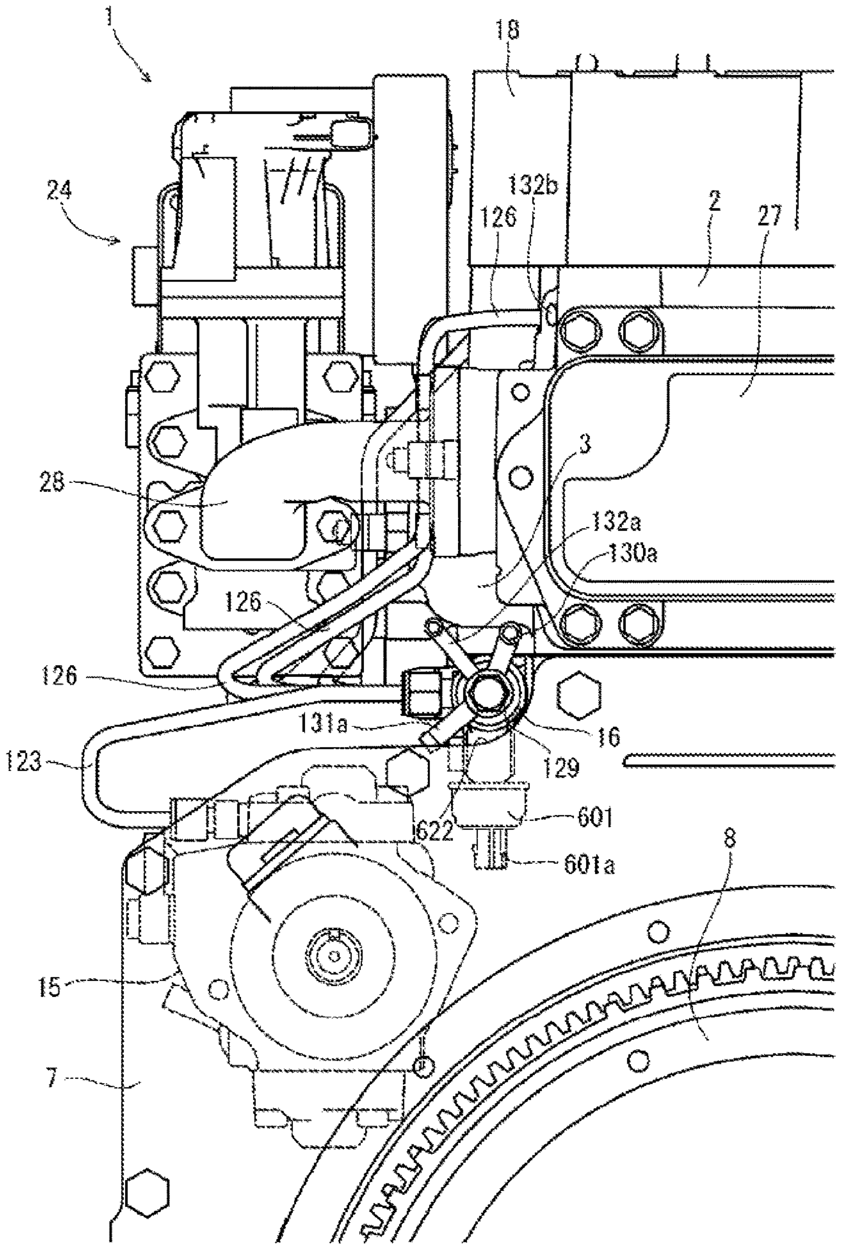
FIG. 19 A front view showing a common rail and therearound.

A bracket recessed portion 621 provided in the right housing bracket portion 305 of the cylinder block 6 and a housing recessed portion 622 provided in the flywheel housing 7 are arranged near an upper front corner of the right surface 302 of the cylinder block 6. As shown in FIG. 19, the recessed portions 621, 622 are provided near the upper front corner of the right surface 302 such that a joining portion where the flywheel housing 7 and the right housing bracket portion 305 are joined with each other is at a level lower than the upper surface of the cylinder block 6. This allows the front end portion of the common rail 16 attached to the right surface 302 of the cylinder block 6 to extend above the recessed portions 621, 622 toward the upper side of the flywheel housing 7.

The return pipe connector 129 includes a connecting portion 130 *a* to which one end of the fuel return pipe 130 (see FIG. 17) is connected, a connecting portion 131 *a* to which one end of the pump surplus fuel return pipe 131 (see FIG. 17) is connected, and a connecting portion 132 *a* to which one end of the injector surplus fuel return pipe 132 (see FIG. 17) is connected. The return pipe connector 129 is provided therein with an internal fluid passage (not shown) that connects the connecting portions 130 *a*, 131 *a*, 132 *a*, and a fuel pressure regulating valve (not shown) disposed between the internal fluid passage and an internal space of the common rail 16. A surplus fuel outlet 132 *b* for a surplus fuel from the injectors 17 (see FIG. 17) is provided in a portion of the cylinder head 2 near an intersection between the right surface 302 and the front surface 303 of the cylinder block 6 (see FIG. 12), which in this embodiment means a portion near a corner where the right surface and the front surface of the cylinder head 2 intersect each other and more specifically means a front end portion of the right surface of the cylinder head 2 relatively close to the upper side. An injector surplus fuel return pipe 132 *c* is disposed in connection between the surplus fuel outlet 132 *b* and the connecting portion 132 *a* of the return pipe connector 129. The surplus fuel outlet 132*b* is connected to a surplus fuel outlet of each injector 17 (see FIG. 17) via a surplus fuel passage (not shown) provided inside a side wall of the cylinder head 2 and the injector surplus fuel return pipe 132 (see FIG. 17) disposed within the cylinder head 2.

Figure 23:
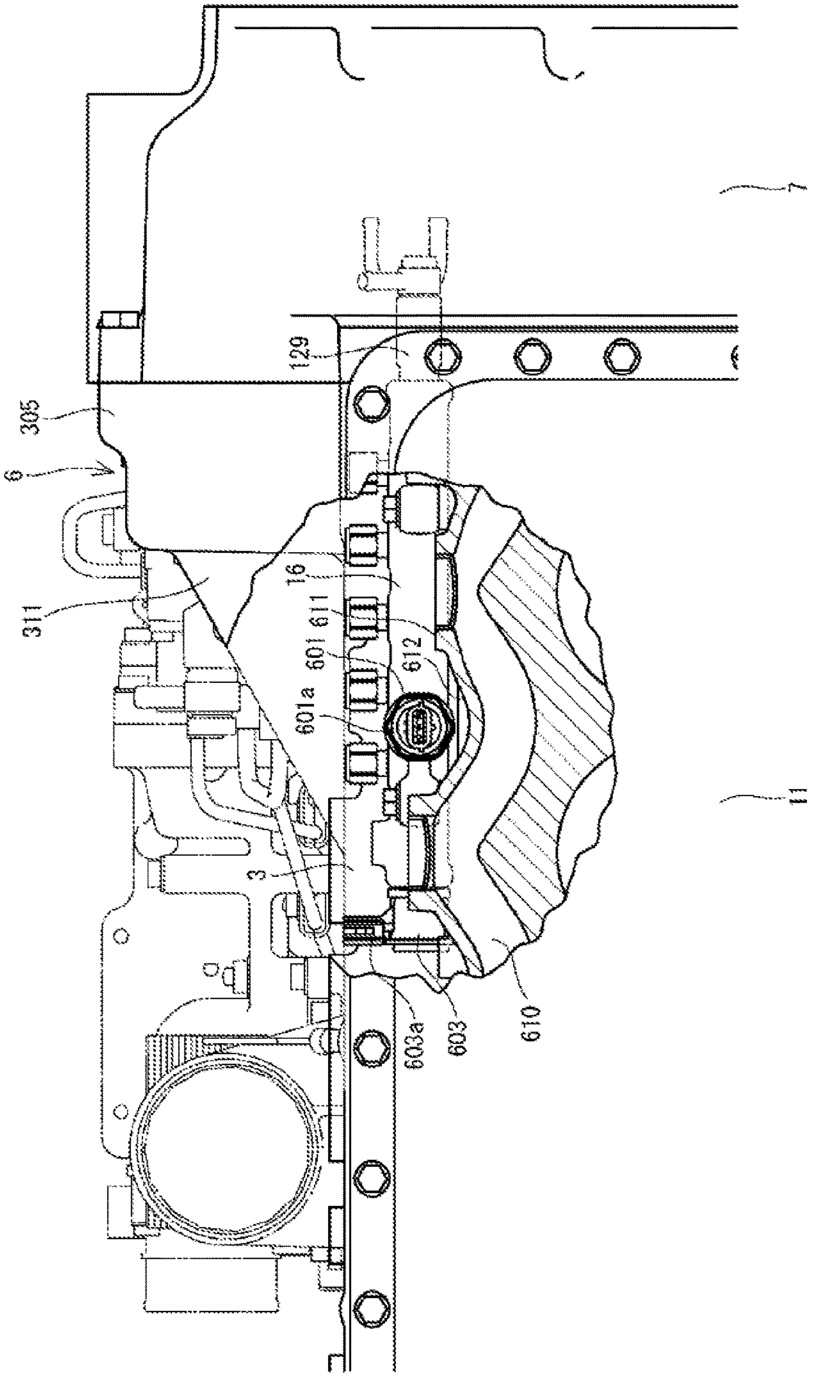
FIG. 23 A bottom plan view showing a connector of the common rail by cutting off a part of an oil pan and a part of the cylinder block.

Connectors 601 *a*, 603 *a* of the fuel pressure sensor 601 and the pressure reducing valve 603 of the common rail 16, which are electrically connected to the engine controller 600 (see FIG. 17), are disposed below the intake manifold 3 of the cylinder head 2. As shown in FIG. 13 and FIG. 23, the right surface 302 of the cylinder block 6 has a concavo-convex surface portion 611 that corresponds to the shape of a water rail 610 (coolant passage) which is provided inside the cylinder block 6. The connector 601 *a* of the fuel pressure sensor 601 is disposed above a concave region 612 of the concavo-convex surface portion 611. A connecting portion of the connector 601 *a* is directed toward the concave region 612 in a side view. A connecting portion of the connector 603 *a* of the pressure reducing valve 603 is directed toward the right lateral side of the engine 1, for example.

Figure 22:
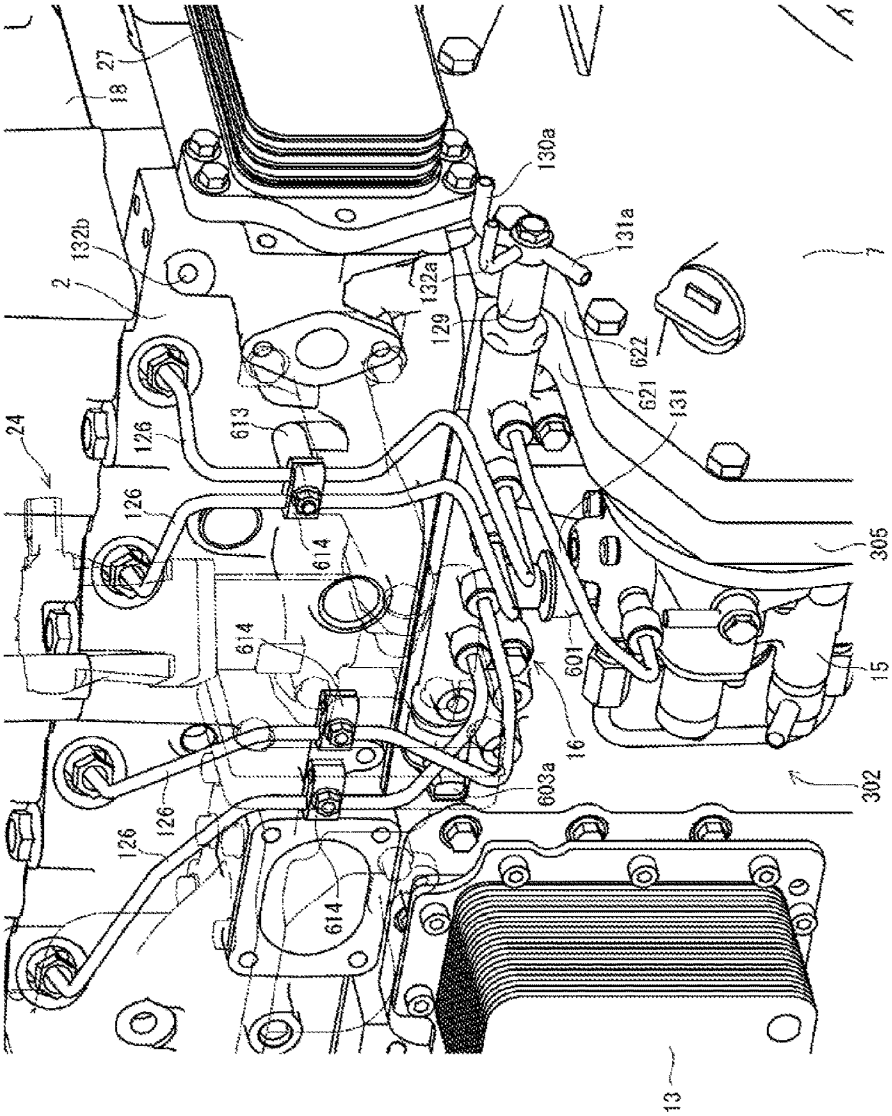
FIG. 22 A perspective view showing fuel injection pipes.

The four fuel injection pipes 126 extending from the common rail 16 toward the cylinder head 2 pass through a space between the cylinder head 2 and the EGR device 24 (exhaust-gas recirculation device), and are connected to the respective injectors 17 (see FIG. 17). As shown in FIG. 22, a midway portion of each of the four fuel injection pipes 126 is attached to the cylinder head 2 by a fuel injection pipe fixture 614 which is attached to the cylinder head 2 directly or with a spacer member 613 interposed therebetween. Since the midway portion of each fuel injection pipe 126 is fixed to the cylinder head 2, the fuel injection pipe 126 causes less vibration, and thus damage of the fuel injection pipe 126 due to vibration can be prevented. In this embodiment, among the four fuel injection pipes 126, two fuel injection pipes 126 located more frontward in the engine 1 have their midway portions fixed to the cylinder head 2 with interposition of a spacer member 613 having a substantially cylindrical shape. By adjusting the spacer member 613 to a desired length, the midway portion of the fuel injection pipe 126 can be fixed at a position that is at any distance from the side surface of the cylinder head 2. Thus, the fuel injection pipe 126 with any shape can be handled without the need to change the design of a surface configuration of the cylinder head 2.

Figure 20:
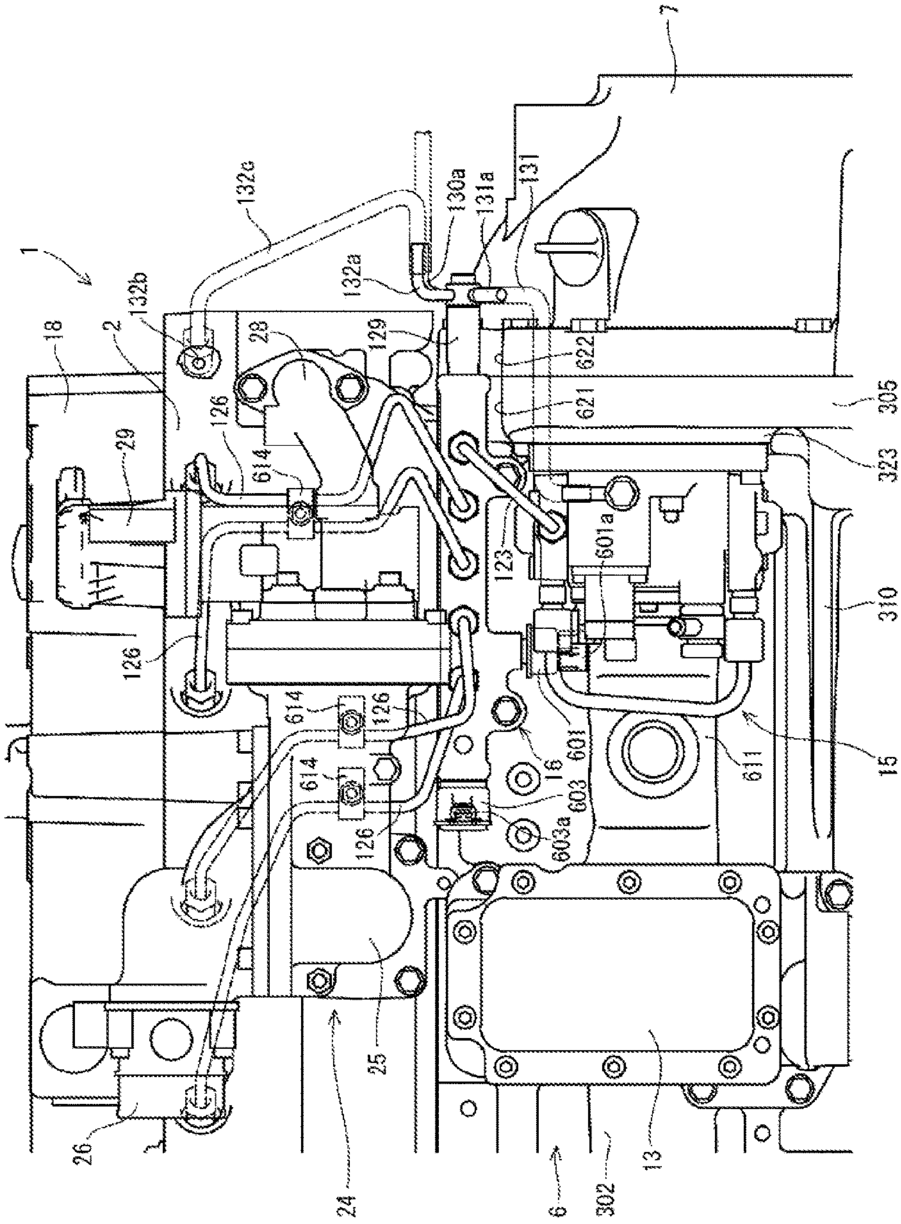
FIG. 20 A right side view showing the common rail and therearound.
Figure 21:
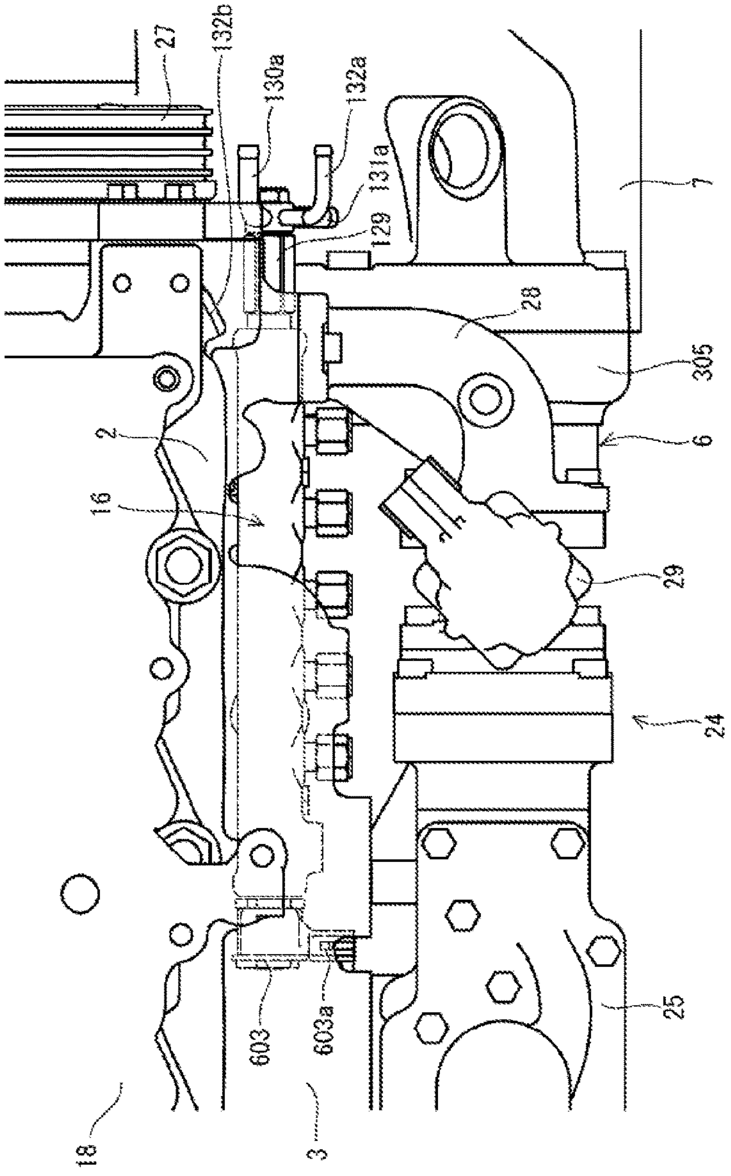
FIG. 21 A top plan view showing the common rail and therearound.

As shown in FIG. 20, the fuel feed pump 15 attached to the right housing bracket portion 305 of the cylinder block 6 is disposed below the EGR device 24. As mentioned above, the right-side first reinforcing rib 310 is arranged directly under the fuel feed pump 15, and the right-side second reinforcing rib 311 is arranged directly under the right-side first reinforcing rib 310, to thereby prevent the fuel feed pump 15 from being contacted by a foreign object such as muddy water or stone coming from below (see FIG. 16).

The engine 1 of this embodiment, in which one end portion of the common rail 16 attached to the right surface 302 (one side portion) of the cylinder block 6 is disposed above the flywheel housing 7, can reduce an area of the right surface 302 of the cylinder block 6 occupied by a region where the common rail 16 is disposed, as compared to a configuration in which the whole of the common rail 16 is disposed on the right surface 302 of the cylinder block 6. Accordingly, the degree of freedom can be enhanced in a layout of other members on the right surface 302 of the cylinder block 6. For example, in the engine device 1 of this embodiment, the oil cooler 13 is arranged on the rear side of a rear end portion of the common rail 16 in the engine 1 such that the oil cooler 13 is close to the intake manifold 3 and the EGR device 24. Thereby, a compact arrangement configuration of these component parts can be achieved.

In the engine 1 of this embodiment, the connectors 601 *a*, 603 *a* of the fuel pressure sensor 601 and the pressure reducing valve 603 of the common rail 16, which are electrically connected to the engine controller 600, are disposed below the intake manifold 3 which is formed integrally with the cylinder head 2. Thus, the intake manifold 3 can protect the connectors 601 *a*, 603 *a* against contact with a foreign object. In addition, the EGR device 24 attached to the intake manifold 3 also protects the connectors 601 *a*, 603 *a* in the same manner.

Since a connection port of the connector 601 *a* is directed toward the concave region 612 of the concavo-convex surface portion 611 that corresponds to the shape of the water rail 610 in a side view. This enables a harness-side connector to be attached to the connector 601 *a* so as to extend along the concave region 612, which can enhance operability in attaching harnesses. Furthermore, this enables the connector 601 *a* to be arranged at a location relatively close to the cylinder block 6, as compared to a configuration in which the connection port of the connector 601 *a* is directed toward the outside of the engine 1. Thus, the width of the engine 1 as a whole can be reduced.

In the engine 1 of this embodiment, the common rail 16 has, in its front end portion, the return pipe connector 129 for returning a surplus fuel, and the surplus fuel outlet 132 *b* for a surplus fuel from the respective injectors 17 is provided near the intersection between the right surface 302 and the front surface 303 of the cylinder block 6 of the cylinder head 2 in a plan view. Since the return pipe connector 129 is disposed above the flywheel housing 7, the injector surplus fuel return pipe 132 *c* (surplus fuel return path) that connects the surplus fuel outlet 132 *b* to the connecting portion 132 *a* of the return pipe connector 129 can be shortened and simplified. This can solve a problem of the conventional technique that a surplus fuel return path for a surplus fuel from the injectors 17 is elongated and complicated. In a case where, for example, the fuel filter 121 (see FIG. 17) is provided in a work machine or a vehicle equipped with the engine 1, a vacant space above the flywheel housing 7 can be used to shorten and simplify a piping path between the fuel filter 121 and the connecting portion 130 *a* of the return pipe connector 129, and also to enhance the degree of freedom in designing the piping path.

In the engine 1 of this embodiment, the EGR device 24 configured to mix a part of the exhaust gas discharged from the exhaust manifold 4 with fresh air is coupled to the intake manifold 3, and the four fuel injection pipes 126 extending from the common rail 16 toward the cylinder head 2 pass through the space between the cylinder head 2 and the EGR device 24. Thus, the fuel injection pipes 126 can be protected by the EGR device 24. This can solve a problem of the conventional technique having a fuel injection pipe assembled to an outer peripheral portion of an engine device, that is, a problem that deformation of the fuel injection pipe or fuel leakage may be caused due to contact between the engine device and another member during transportation or due to falling of a foreign object, for example.

In the engine 1 of this embodiment, the fuel feed pump 15 for supplying a fuel to the common rail 16 is attached to the cylinder block 6 and is disposed below the EGR device 24. This can protect the fuel feed pump 15 against contact with a foreign object coming from above, such as a tool falling at a time of assembling. Thus, damage of the fuel feed pump 15 can be prevented.

In addition, the fuel feed pump 15 is attached to the right housing bracket portion 305 that protrudes from the right surface 302 of the cylinder block 6, and the reinforcing ribs 310, 311 for coupling the right surface 302 to the right housing bracket portion 305 are disposed below the fuel feed pump 15. This can protect the fuel feed pump 15 against contact with a foreign object, such as a stone, coming from below. As a result, damage of the fuel feed pump 15 can be further prevented.

In this embodiment, as shown in FIG. 20, a space is provided between the oil cooler 13 and the fuel feed pump 15, in order to enable the fuel feed pump 15 having the fuel feed pump gear 334 (see FIG. 12) secured thereto to be removed from the right housing bracket portion 305 without the need to remove the oil cooler 13. As shown in FIG. 18, the harness connector 701 and the harness bracket 702 are arranged between the oil cooler 13 and the fuel feed pump 15. Thereby, with effective utilization of the space between the oil cooler 13 and the fuel feed pump 15, the harness connector 701 can be arranged at a position surrounded by the oil cooler 13, the oil filter 14, the fuel feed pump 15, and the EGR device 24, for protection of the harness connector 701.

In a conventional engine device, a coolant inlet of a coolant pump is disposed in a pump main body, and therefore the pump main body needs to be changed if a position of the coolant inlet of the coolant pump needs to be changed in accordance with, for example, a position where a radiator is disposed in a work machine or the like which is equipped with the engine device. There is a problem that a change of the pump main body leads to a major design change and an increase in manufacturing costs. In view of the problems described above, this embodiment enables the position of the coolant inlet of the coolant pump to be changed easily.

Figure 25:
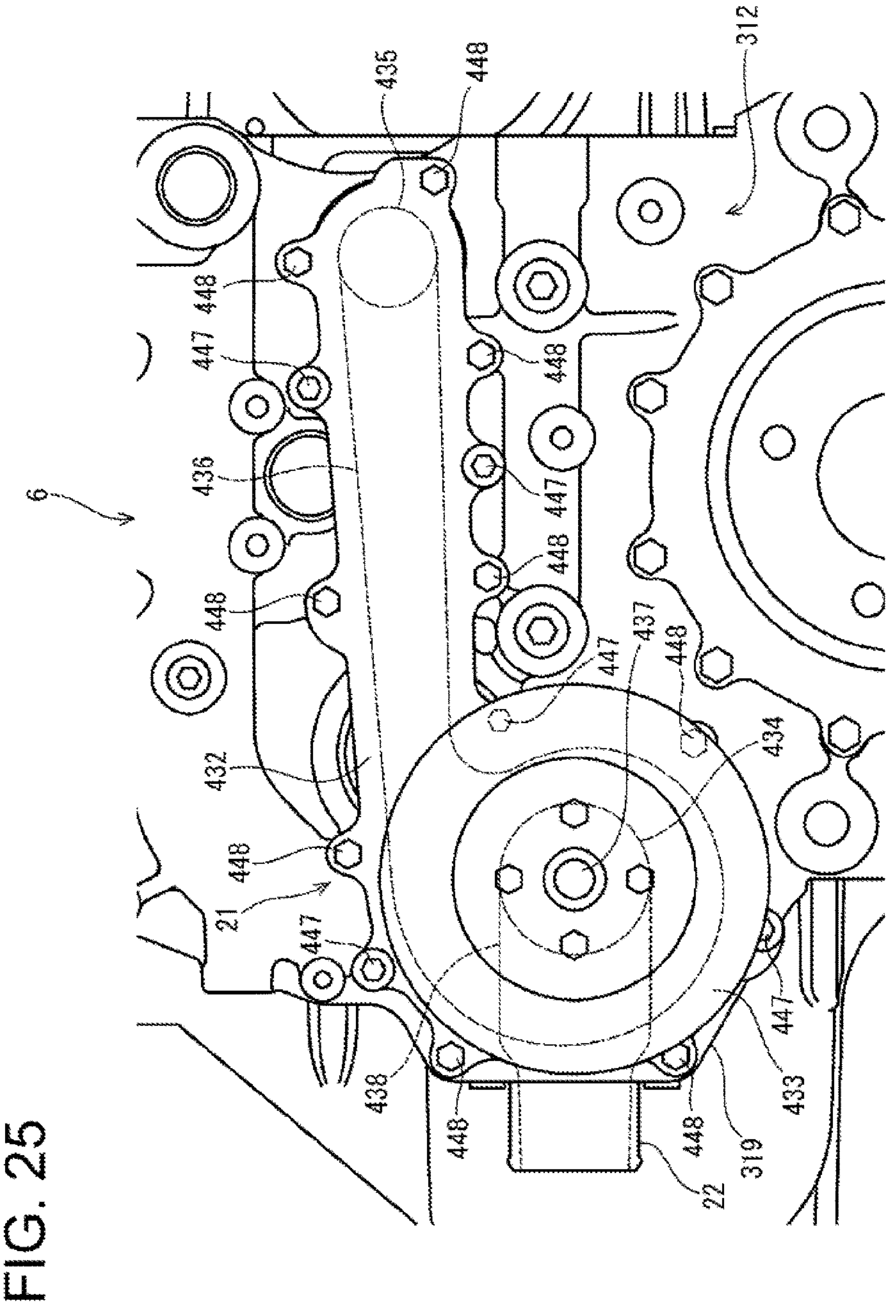
FIG. 25 A rear view showing the cylinder block and a coolant pump.
Figure 26:
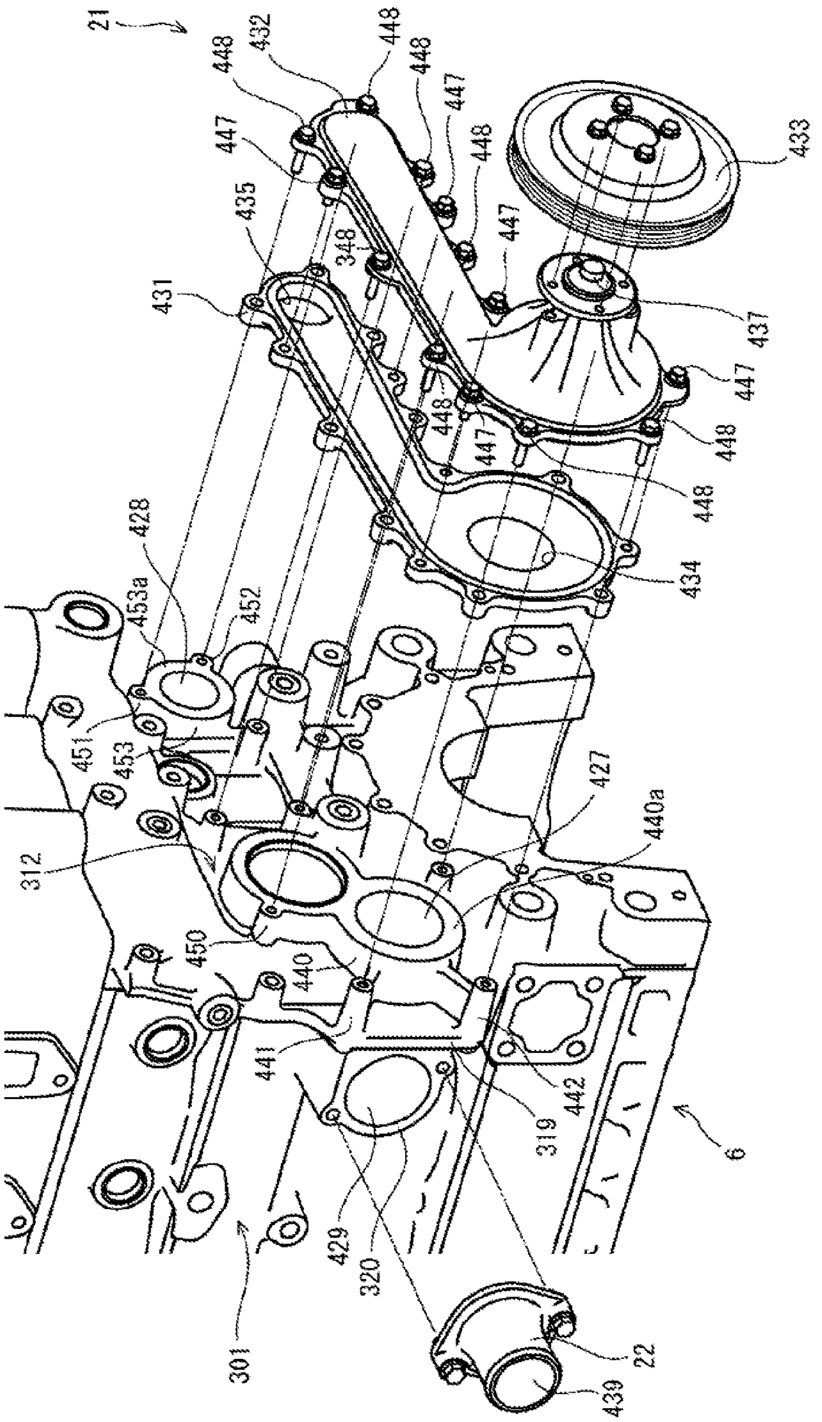
FIG. 26 An exploded perspective view showing a structure for attaching the coolant pump and a coolant inlet pipe.

The coolant pump 21 will now be described with reference to FIG. 24 to FIG. 29. As shown in FIG. 25 and FIG. 26, the coolant pump 21 for circulating a coolant is fastened to the rear surface 312 of the cylinder block 6 and to the coolant pump attaching part 319 with bolts. The coolant pump 21 is roughly divided into a base plate portion 431, a cover plate portion 432, and a pumping pulley 433.

The base plate portion 431 and the cover plate portion 432 have their peripheral edge portions fixed in tight contact with each other by covering bolts 447 that are inserted and fastened, from the cover plate portion 432 side, into five bolting through holes disposed in the peripheral edge portion of the base plate portion 331 and into through holes of the cover plate portion 432 corresponding to the bolting through holes.

The coolant pump 21 is bolt-fastened to the cylinder block 6 such that the plate portions 431, 432 are clamped together by mounting bolts 448 that are inserted in nine through holes disposed in each of the peripheral edge portions of the base plate portion 431 and the cover plate portion 432. Clamping with the mounting bolts 448 causes the peripheral edge portions of the base plate portion 431 and the cover plate portion 432 to be fixed in tight contact with each other, also causes a portion of the cylinder block 6 surrounding a coolant passage outlet 427 and a portion of the coolant pump 21 surrounding a pump suction port 434 to be fixed in tight contact with each other, and further causes a portion of the cylinder block 6 surrounding a coolant inlet port 428 and a portion of the coolant pump 21 surrounding a pump ejection port 435 to be fixed in tight contact with each other. As for arrangement of the bolts 447, 448 along the peripheral edge portion of the coolant pump 21, one or two mounting bolts 448 are disposed between adjacent ones of the covering bolts 447, 447.

Since the base plate portion 431 and the cover plate portion 432 are coupled to each other with the covering bolts 447, the coolant pump 21 can be distributed as a single component, and moreover an attaching work in mounting the coolant pump 21 to the cylinder block 6 with the mounting bolts 448 is easy.

The base plate portion 431, for example, includes a pump suction port 434 and a pump ejection port 435, the pump suction port 434 being connected to the coolant passage outlet 427 which includes a portion of the coolant pump attaching part 319 and which is opened in a portion of the rear surface 312 of the cylinder block 6 relatively close to the left surface 301, the pump ejection port 435 being connected to the coolant inlet port 428 which is opened in a portion of the rear surface 312 of the cylinder block 6 relatively close to the right surface 302.

The base plate portion 431 and the cover plate portion 432 have their peripheral edge portions in tight contact with each other, to form an in-pump coolant passage 436 that connects the pump suction port 434 to the pump ejection port 435. An annular seal member that surrounds the pump suction port 434, the pump ejection port 435, and the in-pump coolant passage 436 is disposed in a portion where the base plate portion 431 and the cover plate portion 432 are in tight contact with each other. The cover plate portion 432 pivotally supports a pump shaft 437 in a rotatable manner. An impeller is secured to one end portion of the pump shaft 437. The pumping pulley 433 is secured to the other end portion of the pump shaft 437.

Figure 27:
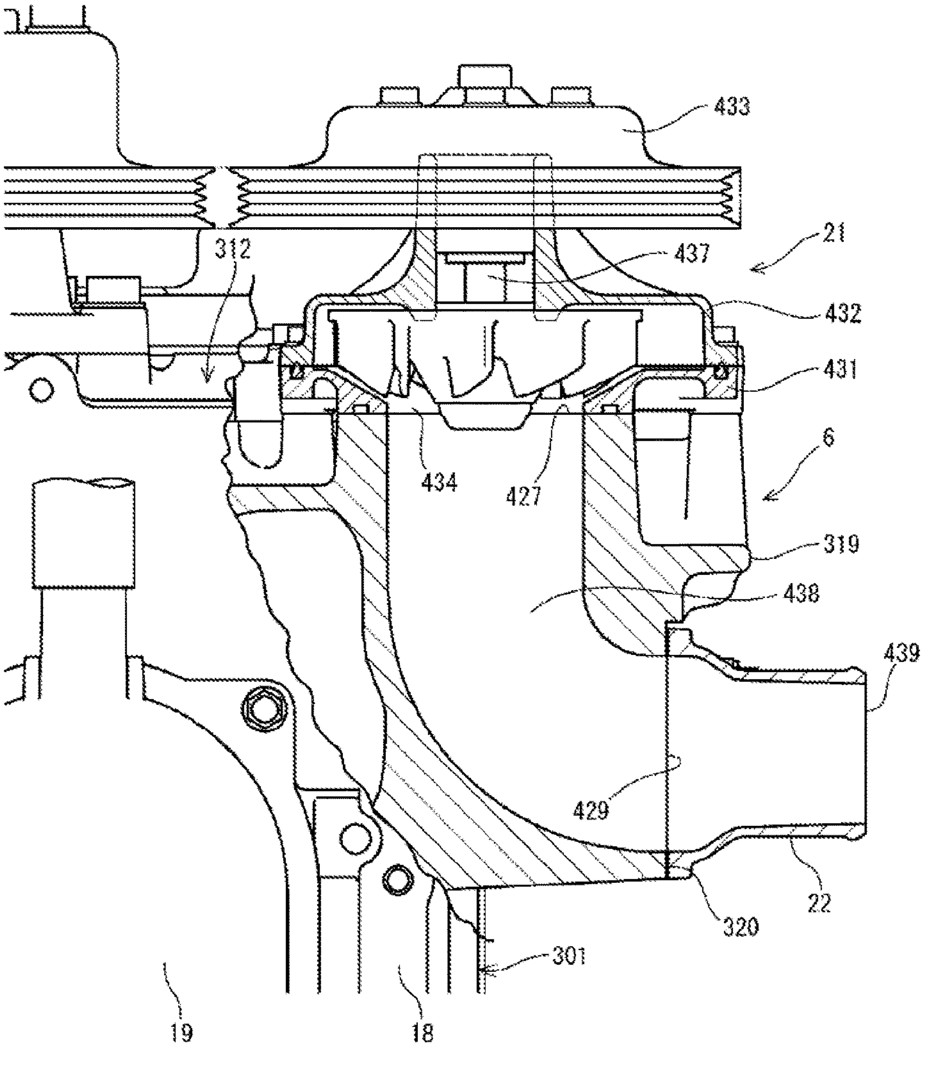
FIG. 27 A top plan view showing a partial cross-section of an in-block coolant passage of the cylinder block.

As shown in FIG. 26 and FIG. 27, a coolant passage inlet 429 is opened in the left surface 301 of the cylinder block 6. The coolant passage inlet 429 is opened in the inlet pipe attachment pedestal 320 which protrudes from the left surface 301. An in-block coolant passage 438 (coolant passage) is formed inside the cylinder block 6. The in-block coolant passage 438 has a substantially L-shape that connects the coolant passage inlet 429 opened in the left surface 301 to the coolant passage outlet 427 opened in the rear surface 312.

The inlet pipe attachment pedestal 320 has a pair of bolt holes on opposite sides of the coolant passage inlet 429. The coolant inlet pipe 22 (coolant inlet member) having a coolant inlet 439 is detachably fastened to the inlet pipe attachment pedestal 320 with bolts. Piping leading to the coolant outlet of the radiator is connected to the coolant inlet pipe 22. A coolant coming from the radiator is introduced into the engine 1 through the coolant inlet pipe 22, flows through the in-block coolant passage 438 and the coolant pump 21, and then is taken into the cylinder block 6 from the coolant inlet port 428.

In the engine 1 of this embodiment, the coolant inlet pipe 22 having the coolant inlet 439 is detachably attached to the coolant passage inlet 429 which leads to the pump suction port 434 of the coolant pump 21. Accordingly, the position of the coolant inlet 439 can be changed just by changing the shape or the like of the coolant inlet pipe 22. This enables the position of the coolant inlet 439 of the coolant pump 21 to be easily changed without any major design change or any increase in manufacturing costs.

The coolant passage outlet 427 that supplies a coolant from the radiator to the coolant pump 21 is disposed on one of the left and right sides of the cylinder block 6, while the coolant inlet port 428 that takes a coolant from the coolant pump 21 into the cylinder block 6 is disposed on the other of the left and right sides of the cylinder block 6. The in-pump coolant passage 436 that connects the coolant passage outlet 427 to the coolant inlet port 428 is disposed across a portion close to the left surface 301 of the cylinder block 6 and a portion close to the right surface 302 of the cylinder block 6. With this configuration, a coolant passing through the in-pump coolant passage 436 is cooled by cooling air supplied from the cooling fan 9 (see FIG. 2) while the coolant is moving from the coolant passage outlet 427 to the coolant inlet port 428. The coolant can be cooled within the coolant pump 21 before being taken into the cylinder block 6 from the coolant inlet port 428. Accordingly, the cooling efficiency of the engine 1 can be enhanced.

Figure 28:
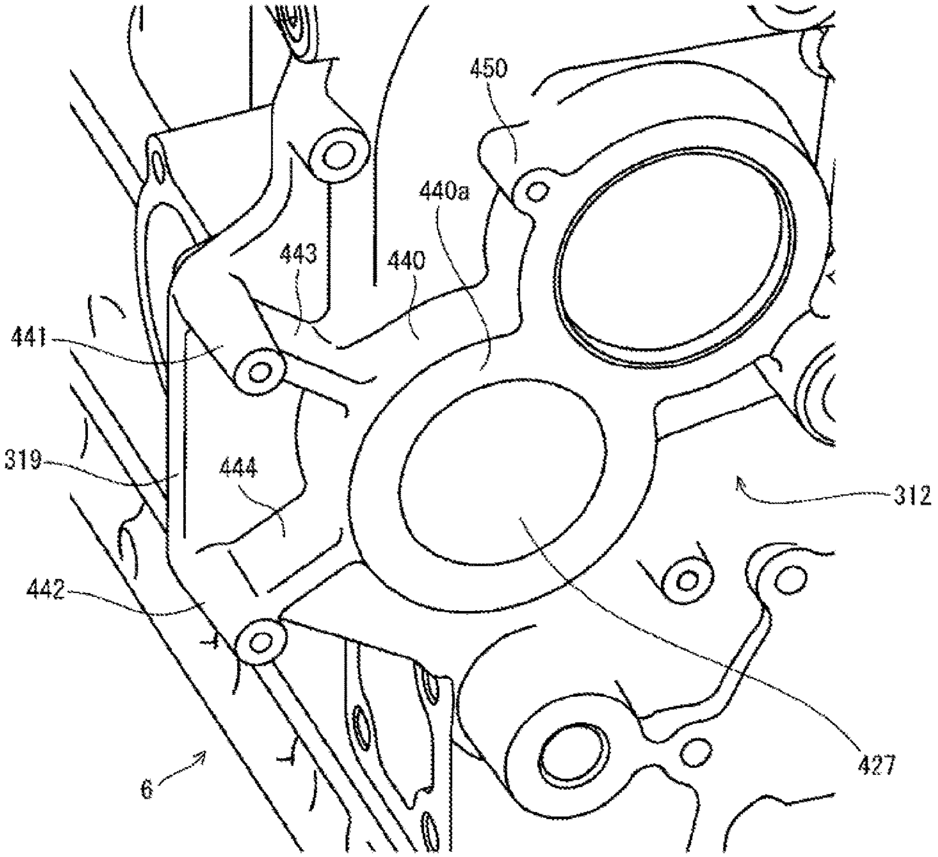
FIG. 28 A perspective view showing a pump suction port connecting portion of the cylinder block and therearound.

As shown in FIG. 28, a pump suction port connecting portion 440, boss portions 441, 442 for pump-attaching bolts, and rib portions 443, 444 protrude from the rear surface 312 of the cylinder block 6. The coolant passage outlet 427 is opened in a pump suction port contact surface 440*a* of the pump suction port connecting portion 440 which constitutes a tight contact surface that is to be in tight contact with the pump suction port 434 (see FIG. 26) of the coolant pump 21.

The boss portions 441, 442 are disposed at positions apart from the pump suction port connecting portion 440, the positions being on the side against a load direction of a load that is applied to the pump shaft 437 (see FIG. 26) due to a tension of the V-belt 10 (see FIG. 24) which is an endless band. In this embodiment, the load direction is a direction starting from the pump shaft 437 and directed generally horizontally rightward of the engine 1 (e.g., the direction from left to right in the drawing sheet of FIG. 24). The boss portions 441, 442 are disposed at locations closer to the peripheral edge portion of the coolant pump attaching part 319 than the pump suction port connecting portion 440, that is, at locations on the side against the load direction when viewed from the pump shaft 437.

The rib portion 443 couples the pump suction port connecting portion 440 to the boss portion 441. The rib portion 444 couples the pump suction port connecting portion 440 to the boss portion 442. A protruding height of the rib portions 443, 444 is such a degree that the rib portions 443, 444 are not in contact with the coolant pump 21. End portions of the rib portions 443, 444 with respect to a protruding direction are at the protruding height which is one step lower than end surfaces of the pump suction port connecting portion 440 and of the boss portions 441, 442.

In this embodiment, the pump suction port contact surface 440 *a* is separated from the end surfaces of the boss portions 441, 442 for pump-attaching bolts, the end surfaces constituting a bearing surface to which the coolant pump 21 is fastened. In addition, the rib portions 443, 444 enhance the rigidity of the boss portions 441, 442. This makes it less likely that the pump suction port 434 and the tight contact surface of the pump suction port contact surface 440 *a* are influenced by deformation of the coolant pump 21 caused by the load applied due to the tension of the V-belt 10. Thus, tight contact properties of the tight contact surface can be obtained. Moreover, the pump suction port connecting portion 440, the boss portions 441, 442 for pump-attaching bolts, and the rib portions 443, 444, which are formed integrally with and protrude from the coolant pump attaching part 319, can enhance the rigidity, strength, and cooling efficiency of the coolant pump attaching part 319, and therefore can enhance the rigidity, strength, and cooling efficiency of the cylinder block 6.

In this embodiment, among bolt-fastened portions of the cylinder block 6 to which the coolant pump 21 is fastened with bolts, a bolt-fastened portion 450 (see FIG. 24, FIG. 26, and FIG. 28) which is one of bolt-fastened portions located left-hand in the engine 1 relative to the pump shaft 437 has its end surface continuous and flush with the pump suction port contact surface 440 *a*. As mentioned above, the load direction of the load applied to the pump shaft 437 due to the tension of the V-belt 10 is a direction starting from the pump shaft 437 and directed generally horizontally rightward of the engine 1. Thus, when a stress due to the tension of the V-belt 10 is applied to the coolant pump 21, the pump suction port 434 which is located between the pump shaft 437 and the bolt-fastened portion 450 suffers less deformation. Accordingly, even though the end surface of the bolt-fastened portion 450 is continuous and flush with the pump suction port contact surface 440 *a*, tight contact properties between the pump suction port 434 and the pump suction port contact surface 440 *a* can be obtained.

Figure 24:
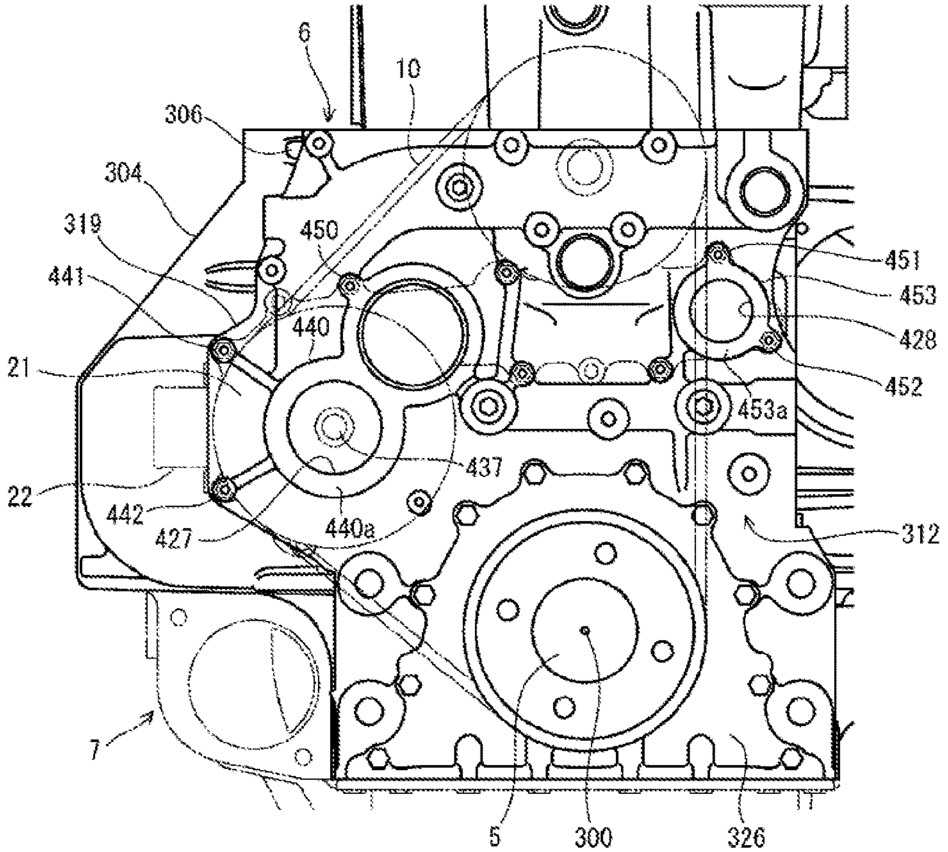
FIG. 24 A rear view showing the cylinder block.

As shown in FIG. 24 and FIG. 26, among the bolt-fastened portions of the cylinder block 6 to which the coolant pump 21 is fastened with bolts, bolt-fastened portions 451, 452 which are arranged around the coolant inlet port 428 are coupled to a pump ejection port connecting portion 453 that protrudes and encloses the coolant inlet port 428. A pump ejection port contact surface 453 *a* of the pump ejection port connecting portion 453 which is to be in tight contact with the pump ejection port 435 of the coolant pump 21 is continuous and flush with end surfaces of the bolt-fastened portions 451, 452. With this configuration as well, the pump ejection port 435 suffers no or very little deformation when a stress due to the tension of the V-belt 10 is applied to the coolant pump 21, and therefore tight contact properties between the coolant inlet port 428 and the pump ejection port 435 can be sufficiently obtained.

Except the boss portions 441, 442 and the bolt-fastened portions 450, 451, 452 described above, all of the other bolt-fastened portions to which the coolant pump 21 is fastened with bolts are disposed right-hand in the engine 1 relative to the pump shaft 437. Thus, configurations of these bolt-fastened portions have a small influence on a variation in the tight contact properties between the pump suction port 434 and the pump suction port contact surface 440 *a*, the variation being due to the tension of the V-belt 10. As for the configurations of the other bolt-fastened portions, therefore, it is only required that the coolant pump 21 can be fixed to the cylinder block 6 with a sufficient fastening force, and unlike the configurations of the boss portions 441, 442, it is not necessary to consider a variation in the tight contact properties between the pump suction port 434 and the pump suction port contact surface 440 *a*, the variation being due to the tension of the V-belt 10. Conversely, in this embodiment, the boss portions 441, 442 and the rib portions 443, 444 are configured in consideration of the tension of the V-belt 10 as described above, and therefore the tight contact properties between the pump suction port 434 and the pump suction port contact surface 440 *a* can be reliably obtained, so that the coolant can be prevented from being leaked through the tight contact surface between the pump suction port 434 and the pump suction port contact surface 440 *a*.

Figure 29:
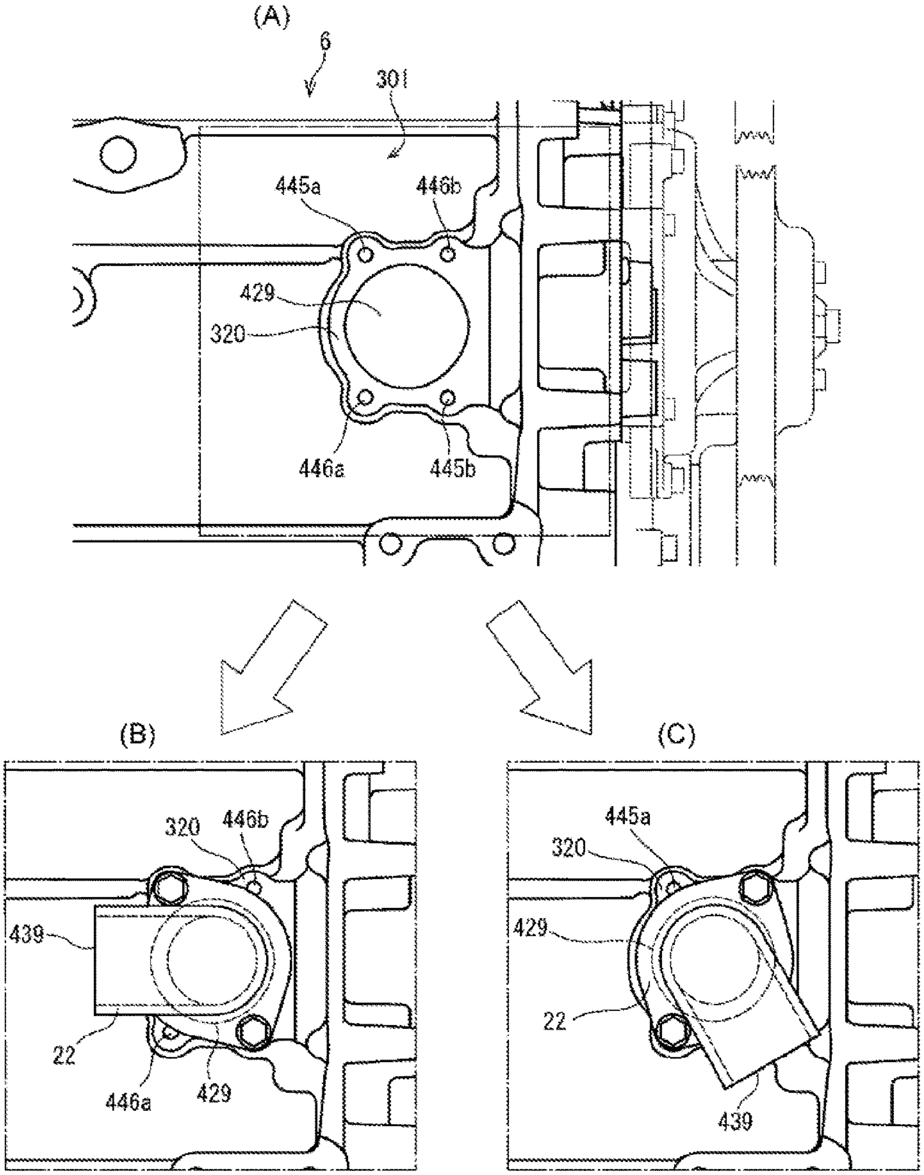
FIG. 29 Right side views showing a variation of the coolant inlet pipe and an inlet pipe attachment pedestal.

A variation of the coolant inlet pipe 22 and the inlet pipe attachment pedestal 320 will now be described with reference to FIG. 29. In this variation, for example, as shown in (B) and (C), the coolant inlet pipe 22 has a substantially L-like tubular shape including a flange portion in which two bolt insertion holes are provided. The flange portion protrudes toward the outer circumferential side from an end portion of the coolant inlet pipe 22 on the side opposite to the coolant inlet 439. The two bolt insertion holes are disposed on opposite sides across a tubular portion. As shown in (A), in the inlet pipe attachment pedestal 320 of the cylinder block 6, a plurality of bolt holes 445 *a*, 445 *b*, 446 *a*, 446 *b* are disposed around the coolant passage inlet 429, for enabling the coolant inlet pipe 22 to be attached at a plurality of attachment positions.

As shown in (A) and (B), the bolt holes 445 *a*, 445 *b* constitute a bolt hole group that enables the coolant inlet pipe 22 to be attached with the coolant inlet 439 being directed toward the front side (the flywheel housing 7 side) of the engine 1. As shown in (A) and (C), the bolt holes 446 *a*, 446 *b* constitute a bolt hole group that enables the coolant inlet pipe 22 to be attached with the coolant inlet 439 being directed obliquely downward toward the rear side of the engine 1. Since the bolt hole group that enables the same coolant inlet pipe 22 to be attached at a plurality of attachment positions is provided in the inlet pipe attachment pedestal 320, the position and orientation of the coolant inlet 439 can be easily changed by changing the attachment position of the coolant inlet pipe 22, without causing an increase in manufacturing costs. The direction in which the coolant inlet pipe 22 is attached to the coolant passage inlet 429 is not limited to two directions. A plurality of bolt hole groups may be provided around the coolant passage inlet 429 such that the coolant inlet pipe 22 can be attached at attachment positions having two or more directions. The shape of the coolant inlet pipe 22 is not limited to an L-shape, but may be any shape.

The configurations of respective parts of the present invention are not limited to those of the illustrated embodiment, but can be variously changed without departing from the gist of the invention.

REFERENCE SIGNS LIST

1 engine
2 cylinder head
3 intake manifold
5 crankshaft
6 cylinder block
7 flywheel housing
8 flywheel
10 V-belt (endless band)
15 fuel feed pump
16 common rail
17 injector (fuel injection device)
21 coolant pump
22 coolant inlet pipe (coolant inlet member)
24 EGR device (exhaust-gas recirculation device)
129 return pipe connector (pipe joint member)
300 crankshaft center
301 left surface (the other lateral side portion)
302 right surface (one lateral side portion)
303 front surface (one side portion)
305 right housing bracket portion
310 right-side first reinforcing rib
311 right-side second reinforcing rib
312 rear surface (the other side portion)
327 coolant passage outlet
329 coolant passage inlet
334 pump suction port
337 pump shaft
338 in-block coolant passage (coolant passage)
339 coolant inlet
340 pump suction port connecting portion
341, 342 boss portion for pump-attaching bolt
343, 344 rib portion
345 *a*, 345 *b*, 346 *a*, 346 *b* bolt hole
601 *a*, 603 *a* connector of common rail
610 water rail (coolant passage)
611 concavo-convex portion
612 concave region

What is claimed is:

1. An engine device comprising:

a common rail attached to one lateral side portion of a cylinder block, the common rail being configured to supply fuel to an engine;

a flywheel housing accommodating a flywheel and disposed in the cylinder block; and at least a portion of the common rail disposed above the flywheel housing.

2. The engine device according to claim 1, wherein the one lateral side portion extending along a crankshaft center; and a flywheel housing is disposed in one side portion out of opposite side portions of the cylinder block intersecting the one side portion.

3. The engine device according to claim 1, wherein a connector of the common rail electrically connected to an engine controller is disposed below an intake manifold that is provided to a cylinder head mounted on the cylinder block.

4. The engine device according to claim 1, wherein the intake manifold is formed integrally with the cylinder head.

5. The engine device according to claim 1, wherein the one lateral side portion of the cylinder block has a concavo-convex surface portion that corresponds to a shape of a coolant passage provided inside the cylinder block, and a connection port of the connector is directed toward a concave region of the concavo-convex surface portion in a side view.

6. The engine device according to claim 1, wherein an exhaust-gas recirculation device is coupled to the intake manifold, the exhaust-gas recirculation device being configured to mix part of an exhaust gas discharged from an exhaust manifold with fresh air, and a fuel injection pipe extending from the common rail toward the cylinder head passes through a space between the cylinder head and the exhaust-gas recirculation device.

7. The engine device according to claim 6, wherein a fuel feed pump that is attached to the cylinder block is disposed below the exhaust-gas recirculation device, the fuel feed pump being configured to supply a fuel to the common rail.

8. The engine device according to claim 7, wherein the fuel feed pump is attached to a housing bracket portion that protrudes from the one lateral side portion of the cylinder block, and a reinforcing rib that couples the one lateral side portion to the housing bracket portion is disposed below the fuel feed pump.

9. The engine device according to claim 1, wherein, the common rail has, in the one end portion, a pipe joint member for returning a surplus fuel, and in a cylinder head mounted on the cylinder block, a surplus fuel outlet for a surplus fuel from a fuel injection device is provided near an intersection between the one lateral side portion and the one side portion of the cylinder block in plan view.

10. An engine device comprising:

a common rail attached to one lateral side portion of a cylinder block, the common rail being configured to supply fuel to an engine;

a flywheel housing accommodating a flywheel and disposed in the cylinder block; and at least a portion of the common rail disposed above the flywheel housing, wherein a coolant-circulating coolant pump is disposed in another side portion out of the opposite side portions of the cylinder block intersecting the one lateral side portion, and a coolant passage that connects a coolant passage inlet to a coolant passage outlet is provided in the cylinder block, and a coolant inlet member having a coolant inlet is detachably attached to the coolant passage inlet, the coolant passage inlet being opened in the one lateral side portion or the other lateral side portion intersecting the other side portion of the cylinder block, the coolant passage outlet being opened in the other side portion and being connected with a pump suction port of the coolant pump.

11. The engine device according to claim 10, wherein a rotational force of the crankshaft is transmitted to a pump shaft of the coolant pump through an endless band, and a pump suction port connecting portion, a boss portion for a pump-attaching bolt, and a rib portion are provided in the other side portion, the pump suction port connecting portion protruding and having an end surface in which the coolant passage outlet is formed, the boss portion protruding at a position apart from the pump suction port connecting portion, the position being on a side against a load direction of a load that is applied to the pump shaft due to a tension of the endless band, the rib portion coupling the pump suction port connecting portion to the boss portion and protruding with such a protruding height that the rib portion is not in contact with the coolant pump.

12. The engine device according to claim 10, wherein a plurality of bolt hole groups are provided around the coolant passage inlet, the plurality of bolt hole groups enabling the coolant inlet member to be attached at a plurality of attachment positions.

* * * * *